United States Patent
Paz et al.

(10) Patent No.: US 12,127,183 B2
(45) Date of Patent: Oct. 22, 2024

(54) DYNAMIC AND ADAPTIVE CODE BLOCK MAPPING SELECTION

(71) Applicant: QUALCOMM Incorporated, San Diego, CA (US)

(72) Inventors: Daniel Paz, Geva Carmel (IL); Michael Levitsky, Rehovot (IL); Jacob Pick, Beit Zayit (IL); Idan Michael Horn, Hod Hasharon (IL); Gideon Shlomo Kutz, Ramat Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 17/400,804

(22) Filed: Aug. 12, 2021

(65) Prior Publication Data

US 2023/0047824 A1    Feb. 16, 2023

(51) Int. Cl.
*H04W 72/1263*    (2023.01)
*H04W 72/0446*    (2023.01)
(Continued)

(52) U.S. Cl.
CPC ... *H04W 72/1263* (2013.01); *H04W 72/0446* (2013.01); *H04W 72/0453* (2013.01); *H04W 72/23* (2023.01); *H04W 72/54* (2023.01)

(58) Field of Classification Search
CPC ......... H04W 72/1263; H04W 72/0446; H04W 72/0453; H04W 72/23; H04W 72/54; H04L 5/0016
See application file for complete search history.

(56) References Cited

U.S. PATENT DOCUMENTS

2006/0234628 A1\* 10/2006 Horiguchi ............... H04L 5/006
455/39
2009/0034476 A1\* 2/2009 Wang ................ H04W 36/0011
370/310
(Continued)

FOREIGN PATENT DOCUMENTS

WO    WO-2017019132 A1    2/2017

OTHER PUBLICATIONS

Huawei et al., "Resource Allocation and Indication for Data Channel," 3GPP TSG RAN WG1 Meeting #88bis, R1-1705069, Spokane, USA, Apr. 3-7, 2017, XP051251727, 8 Pages.
(Continued)

*Primary Examiner* — Christine Ng
(74) *Attorney, Agent, or Firm* — Paul M. McAdams; Holland & Hart LLP

(57) ABSTRACT

Methods, systems, and devices for wireless communications are described. Generally, the described techniques provide for flexible selection of a type of mapping to use for mapping code blocks to a set of resources for transmission. A user equipment (UE) may transmit assistance information to a base station to assist the base station in selecting from a set of mapping types available for code block mapping. The UE may then receive, from the base station, an indication of a selected mapping type for code block mapping based on the assistance information. The assistance information may include a recommendation of a mapping type or a metric of a channel that the base station may use to select the mapping type. Because the mapping type may be selected dynamically (e.g., "on the fly"), the UE and the base station may be able to adaptively exploit different types of diversity.

30 Claims, 17 Drawing Sheets

(51) Int. Cl.
*H04W 72/0453* (2023.01)
*H04W 72/23* (2023.01)
*H04W 72/54* (2023.01)

(56) References Cited

U.S. PATENT DOCUMENTS

| | | | | |
|---|---|---|---|---|
| 2010/0008333 | A1* | 1/2010 | Kim | H04L 5/0053 370/336 |
| 2012/0230217 | A1* | 9/2012 | Sawai | H04L 5/0094 370/252 |
| 2015/0263825 | A1* | 9/2015 | Kim | H04L 1/0071 375/260 |
| 2016/0080115 | A1* | 3/2016 | Josiam | H04L 5/0055 370/329 |
| 2017/0135084 | A1* | 5/2017 | Kuchibhotla | H04L 5/0007 |
| 2017/0201968 | A1* | 7/2017 | Nam | H04L 5/0007 |
| 2018/0368019 | A1* | 12/2018 | Nammi | H04L 25/0204 |
| 2021/0084383 | A1* | 3/2021 | Xiang | H04N 21/64792 |
| 2021/0273759 | A1* | 9/2021 | Maki | H04L 1/0003 |
| 2021/0385037 | A1* | 12/2021 | Yoon | H04L 5/0048 |
| 2023/0058307 | A1* | 2/2023 | MolavianJazi | H04L 25/03038 |

OTHER PUBLICATIONS

International Search Report and Written Opinion—PCT/US2022/036547—ISA/EPO—Oct. 24, 2022.
Samsung: "Code Block Reordering in HARQ Retransmissions", 3GPP TSG RAN WG1 Meeting #50, 3GPP Draft, R1-073579, 3rd Generation Partnership Project (3GPP), Mobile Competence Centre, 650, Route Des Lucioles, F-06921 Sophia-Antipolis Cedex, France, vol. RAN WG1, No. Athens, Greece; Aug. 20, 2007-Aug. 24, 2007, Aug. 15, 2007 (Aug. 15, 2007), pp. 1-4, XP050107182, [retrieved on Aug. 15, 2007].

* cited by examiner

Standard mapping 300-a

Mapping Example 1

300-b

Mapping Example 2

300-c

■ Time Diversity　　▨ Frequency Diversity　　▨ Layers Diversity

DYNAMIC AND ADAPTIVE CODE BLOCK MAPPING SELECTION

FIELD OF TECHNOLOGY

The following relates to wireless communications, including dynamic and adaptive code block mapping selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a transmitting device may encode data in the form of code blocks and map the code blocks to a set of resources for transmission to a receiving device. Improved techniques for mapping code blocks to a set of resources for transmission may be desirable.

SUMMARY

The described techniques relate to improved methods, systems, devices, and apparatuses that support dynamic and adaptive code block mapping selection. Generally, the described techniques provide for flexible selection of a type of mapping to use for mapping code blocks to a set of resources for transmission. A user equipment (UE) may transmit assistance information to a base station to assist the base station in selecting from a set of mapping types available for code block mapping. The UE may then receive, from the base station, an indication of a selected mapping type for code block mapping based on the assistance information. The assistance information may include a recommendation of a mapping type for code block mapping or a metric of a channel that the base station may use to select the mapping type for code block mapping. Because the mapping type may be selected dynamically (e.g., "on the fly"), the UE and the base station may be able to adaptively exploit different types of diversity depending on which types of diversity are beneficial (e.g., frequency diversity, time diversity, or spatial diversity).

A method for wireless communication at a user equipment (UE) is described. The method may include transmitting, to a base station, assistance information for selecting from a set of multiple mapping types available for code block mapping, receiving, from the base station based on transmitting the assistance information, an indication of a selected mapping type for code block mapping, and communicating with the base station based on the selected mapping type for code block mapping.

An apparatus for wireless communication at a UE is described. The apparatus may include a processor, memory coupled with the processor, and instructions stored in the memory. The instructions may be executable by the processor to cause the apparatus to transmit, to a base station, assistance information for selecting from a set of multiple mapping types available for code block mapping, receive, from the base station based on transmitting the assistance information, an indication of a selected mapping type for code block mapping, and communicate with the base station based on the selected mapping type for code block mapping.

Another apparatus for wireless communication at a UE is described. The apparatus may include means for transmitting, to a base station, assistance information for selecting from a set of multiple mapping types available for code block mapping, means for receiving, from the base station based on transmitting the assistance information, an indication of a selected mapping type for code block mapping, and means for communicating with the base station based on the selected mapping type for code block mapping.

A non-transitory computer-readable medium storing code for wireless communication at a UE is described. The code may include instructions executable by a processor to transmit, to a base station, assistance information for selecting from a set of multiple mapping types available for code block mapping, receive, from the base station based on transmitting the assistance information, an indication of a selected mapping type for code block mapping, and communicate with the base station based on the selected mapping type for code block mapping.

In some examples of the method, apparatuses, and non-transitory computer-readable medium described herein, transmitting the assistance information may include operations, features, means, or instructions for selecting the mapping type from the set of multiple mapping types available for code block mapping based on a metric of a channel between the base station and the UE and transmitting, to the base station, a recommendation of the selected mapping type.

In some examples of the method, apparatuses, and non-transitory computer-readable medium described herein, the metric of the channel includes measurements performed on channel state information reference signals, measurements performed on tracking reference signals, an estimation of a decoding probability for each code block, a metric of impairments at the UE, or a combination thereof.

Some examples of the method, apparatuses, and non-transitory computer-readable medium described herein may further include operations, features, means, or instructions for receiving, from the base station, radio resource control signaling indicating the set of multiple mapping types from which the UE may be to select the mapping type for the recommendation.

In some examples of the method, apparatuses, and non-transitory computer-readable medium described herein, transmitting the assistance information may include operations, features, means, or instructions for transmitting, to the base station, measurements performed on channel state information reference signals, measurements performed on tracking reference signals, an estimation of a decoding probability for each code block, an indication of impairments at the UE, or a combination thereof.

In some examples of the method, apparatuses, and non-transitory computer-readable medium described herein, the assistance information may be based on a previous quantity of downlink allocations.

In some examples of the method, apparatuses, and non-transitory computer-readable medium described herein, the set of multiple mapping types includes a frequency-first mapping type, a time-first mapping type, a frequency-first-per-layer mapping type, or a combination thereof.

In some examples of the method, apparatuses, and non-transitory computer-readable medium described herein, receiving the indication of the selected mapping type for code block mapping may include operations, features, means, or instructions for receiving the indication of the selected mapping type for code block mapping in downlink control information, a medium access control control element, or radio resource control signaling.

In some examples of the method, apparatuses, and non-transitory computer-readable medium described herein, transmitting the assistance information may include operations, features, means, or instructions for transmitting the assistance information in a channel state feedback report to the base station.

In some examples of the method, apparatuses, and non-transitory computer-readable medium described herein, the channel state feedback report includes a field for the assistance information.

In some examples of the method, apparatuses, and non-transitory computer-readable medium described herein, communicating with the base station based on the selected mapping type may include operations, features, means, or instructions for mapping one or more code blocks to a set of resources based on the selected mapping type and transmitting, to the base station, the one or more code blocks on the set of resources based on the mapping.

In some examples of the method, apparatuses, and non-transitory computer-readable medium described herein, communicating with the base station based on the selected mapping type may include operations, features, means, or instructions for receiving, from the base station, one or more code blocks mapped to a set of resources and de-mapping the one or more code blocks from the set of resources based on the selected mapping type.

A method for wireless communication at a base station is described. The method may include selecting a mapping type from a set of multiple mapping types available for code block mapping to use for communications with a UE, transmitting, to the UE, an indication of the selected mapping type for code block mapping, and communicating with the UE based on the selected mapping type for code block mapping.

An apparatus for wireless communication at a base station is described. The apparatus may include a processor, memory coupled with the processor, and instructions stored in the memory. The instructions may be executable by the processor to cause the apparatus to select a mapping type from a set of multiple mapping types available for code block mapping to use for communications with a UE, transmit, to the UE, an indication of the selected mapping type for code block mapping, and communicate with the UE based on the selected mapping type for code block mapping.

Another apparatus for wireless communication at a base station is described. The apparatus may include means for selecting a mapping type from a set of multiple mapping types available for code block mapping to use for communications with a UE, means for transmitting, to the UE, an indication of the selected mapping type for code block mapping, and means for communicating with the UE based on the selected mapping type for code block mapping.

A non-transitory computer-readable medium storing code for wireless communication at a base station is described. The code may include instructions executable by a processor to select a mapping type from a set of multiple mapping types available for code block mapping to use for communications with a UE, transmit, to the UE, an indication of the selected mapping type for code block mapping, and communicate with the UE based on the selected mapping type for code block mapping.

In some examples of the method, apparatuses, and non-transitory computer-readable medium described herein, selecting the mapping type may include operations, features, means, or instructions for selecting the mapping type from the set of multiple mapping types based on scheduling information for the communications with the UE, a channel state feedback report for downlink, a sounding reference signal based rank, a modulation and coding scheme estimation for uplink, a delay spread, a doppler spread, signal-to-noise ratio measurements, an uplink code block decoding statistic, UE speed measurements or reports, latency requirements for the communications with the UE, or a combination thereof.

In some examples of the method, apparatuses, and non-transitory computer-readable medium described herein, selecting the mapping type may include operations, features, means, or instructions for receiving, from the UE, assistance information for selecting the mapping type from the set of multiple mapping types available for code block mapping, where selecting the mapping type includes and selecting the mapping type from the set of multiple mapping types based on the assistance information.

In some examples of the method, apparatuses, and non-transitory computer-readable medium described herein, the assistance information includes a recommendation of the selected mapping type for code block mapping.

Some examples of the method, apparatuses, and non-transitory computer-readable medium described herein may further include operations, features, means, or instructions for transmitting, to the UE, radio resource control signaling indicating the set of multiple mapping types from which the UE may be to select the mapping type for the recommendation.

In some examples of the method, apparatuses, and non-transitory computer-readable medium described herein, the assistance information includes measurements performed on channel state information reference signals, measurements performed on tracking reference signals, an estimation of a decoding probability for each code block, an indication of impairments at the UE, or a combination thereof.

In some examples of the method, apparatuses, and non-transitory computer-readable medium described herein, the assistance information may be based on a previous quantity of downlink allocations.

In some examples of the method, apparatuses, and non-transitory computer-readable medium described herein, receiving the assistance information may include operations, features, means, or instructions for receiving the assistance information in a channel state feedback report to the base station.

In some examples of the method, apparatuses, and non-transitory computer-readable medium described herein, the channel state feedback report includes a field for the assistance information.

In some examples of the method, apparatuses, and non-transitory computer-readable medium described herein, the set of multiple mapping types includes a frequency-first mapping type, a time-first mapping type, or a frequency-first-per-layer mapping type.

In some examples of the method, apparatuses, and non-transitory computer-readable medium described herein, transmitting the indication of the selected mapping type for code block mapping may include operations, features, means, or instructions for transmitting the indication of the selected mapping type for code block mapping in downlink control information, a medium access control control element, or radio resource control signaling.

In some examples of the method, apparatuses, and non-transitory computer-readable medium described herein, communicating with the UE based on the selected mapping type may include operations, features, means, or instructions for mapping one or more code blocks to a set of resources based on the selected mapping type and transmitting, to the UE, the one or more code blocks on the set of resources based on the mapping.

In some examples of the method, apparatuses, and non-transitory computer-readable medium described herein, communicating with the UE based on the selected mapping type may include operations, features, means, or instructions for receiving, from the UE, one or more code blocks mapped to a set of resources and de-mapping the one or more code blocks from the set of resources based on the selected mapping type.

DETAILED DESCRIPTION

In some wireless communications systems, a transmitting device may encode data in the form of code blocks, and the transmitting device may map the code blocks to a set of resources for transmission to a receiving device. In some implementations, the transmitting device may be configured with a fixed mapping type to use for mapping the code blocks to the set of resources for the transmission. For instance, the transmitting device may be configured to map the code blocks to the set of resources using a frequency-first mapping type. Using the frequency-first mapping type, the transmitting device may map each code block to a range of frequency resources, and the transmission of the code blocks may benefit from frequency diversity. In some cases, however, it may be more suitable for the transmitting device to transmit the code blocks with other types of diversity (e.g., time diversity or spatial diversity), but the frequency-first mapping type and the frequency diversity may come at the expense of these other types of diversity.

As described herein, a wireless communications system may support efficient techniques for flexible selection of a type of mapping to use for mapping code blocks to a set of resources for a transmission to improve throughput in the wireless communications system. A UE may transmit assistance information to a base station to assist the base station in selecting from a set of mapping types available for code block mapping. The UE may then receive, from the base station, an indication of a selected mapping type for code block mapping based on the assistance information. The assistance information may include a recommendation of a mapping type for code block mapping or a metric of a channel that the base station may use to select the mapping type for code block mapping. Because the mapping type may be selected dynamically (e.g., "on the fly"), the UE and the base station may be able to adaptively exploit different types of diversity depending on which types of diversity are beneficial (e.g., frequency diversity, time diversity, or spatial diversity).

Aspects of the disclosure are initially described in the context of wireless communications systems. Examples of processes and signaling exchanges that support dynamic and adaptive code block mapping selection are then described. Aspects of the disclosure are further illustrated by and described with reference to apparatus diagrams, system diagrams, and flowcharts that relate to dynamic and adaptive code block mapping selection.

Figure 1:
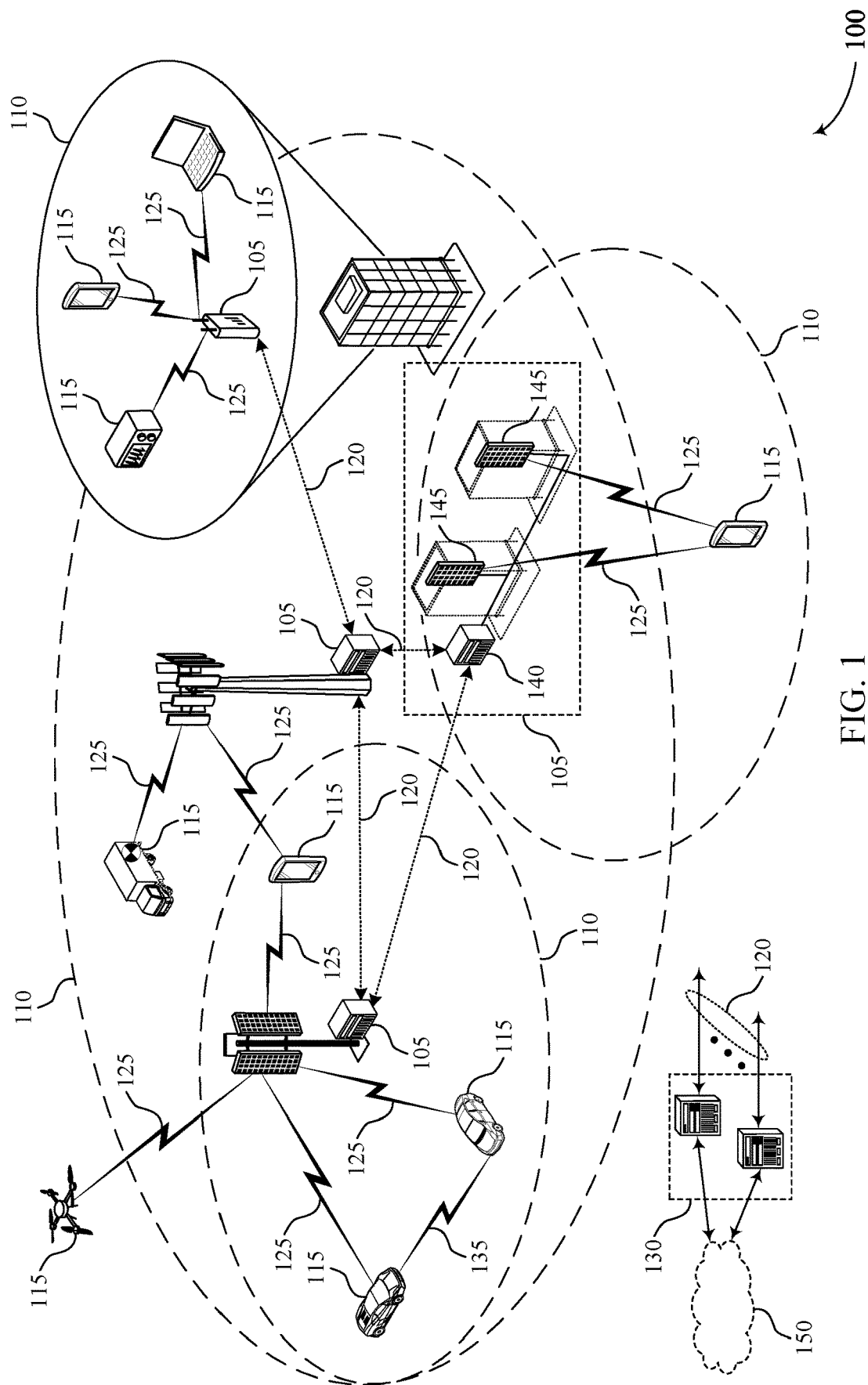
FIG. 1 illustrates an example of a wireless communications system that supports dynamic and adaptive code block mapping selection in accordance with aspects of the present disclosure.

FIG. 1 illustrates an example of a wireless communications system 100 that supports dynamic and adaptive code block mapping selection in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In wireless communications system 100, a transmitting device (e.g., a UE 115 or base station 105) may encode data in the form of code blocks, and the transmitting device may map the code blocks to a set of resources for transmission to a receiving device (e.g., another UE 115 or base station 105). In some implementations, the transmitting device may be configured with a fixed mapping type to use for mapping the code blocks to the set of resources for the transmission. For instance, a 5G NR standard code block mapping may be done in a frequency-first manner, where modulated symbols of all layers in parallel are mapped to contiguous resource elements along a frequency dimension first from a lowest resource element index to a highest resource element index (e.g., code block after code block). In some cases, the transmitting device may also perform interleaving for PDSCH and PUSCH channels in 5G on a code block basis using a column-row interleaver (e.g., each individual code block may be interleaved to increase diversity).

The frequency-first mapping approach, combined with the interleaving operation, may mainly exploit frequency and spatial (e.g., layer) diversity. For instance, every code block may contain an equal number of constellation symbols or resource elements associated with up to four layers, where layer diversity may be relevant in the case of a MIMO transmission with more than a single layer. Other code block mapping strategies (e.g., other than the frequency-first mapping strategy) may help to better and adaptively exploit different available diversity dimensions such as time, frequency, and spatial (or layer) diversity. However, the frequency-first mapping approach or type and the frequency diversity may come at the expense of other types of diversity.

As an example, time diversity may be enhanced or exploited when a code block (or every code block) spans multiple OFDM symbols. Enhanced time diversity may be beneficial for scenarios with a relatively low time coherency of a channel (e.g., high Doppler spread) or in a case where a channel estimation error is not equal for all OFDM data symbols in an allocation. In some cases, a channel estimation error may be significantly higher for edge OFDM symbols of an allocation (e.g., a first or last few OFDM symbols in a transmission) due to a required channel extrapolation. Frequency diversity may be enhanced or exploited when code blocks span multiple resource blocks. Enhanced frequency diversity may be beneficial for scenarios with a relatively low channel coherency bandwidth (e.g., mid/high delay spread). Spatial or layer diversity (e.g., relevant for the case of MIMO with a rank greater than one) may be enhanced or exploited when a code block (or every code block) spans multiple layers. Enhanced spatial or layer diversity may be desired as layer imbalance increases.

To improve an alignment between a code block mapping strategy or type and a dominant diversity type (e.g., frequency, time, or spatial diversity) for different channels and allocation scenarios, wireless communications system 100 may support efficient techniques for dynamic and adaptive code block mapping type selection. This improved alignment may result in improved link efficiency and reliability. Dynamic code block mapping types adaptively selected per scenario may be applicable for a wide range of applications and use cases. The use cases may involve different frequency ranges such as FR1 (a first or lower frequency range which may span 4.1 GHz to 7.125 GHz in some examples) or FR2 (e.g., a second or higher frequency range which may span 24.25 GHz to 52.6 GHz in some examples). Examples of these applications and use cases may include high mobility scenarios for FR1 (e.g., with a dominant diversity on a time axis), a high-speed train single frequency network (HST-SFN) without Doppler shift pre-compensation (e.g., with a dominant diversity on a time axis), high capability UEs 115 and customer provided equipment (CPE) or integrated access and backhaul (IAB) for FR1 and FR2 (e.g., an improved balance between frequency and layer diversity may be desirable), or small allocation scenarios for both FR1 and FR2 (e.g., frequency diversity potential may be limited by an allocation size).

Figure 2:
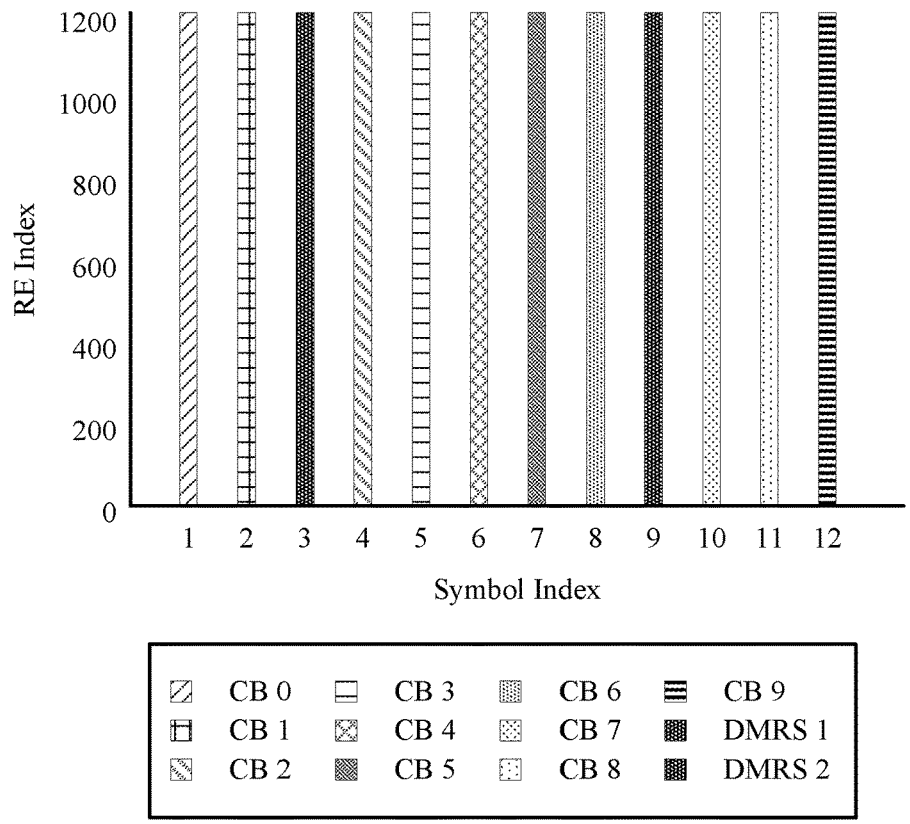
FIG. 2 illustrates an example of a frequency-first mapping in accordance with aspects of the present disclosure.
Figure 2:
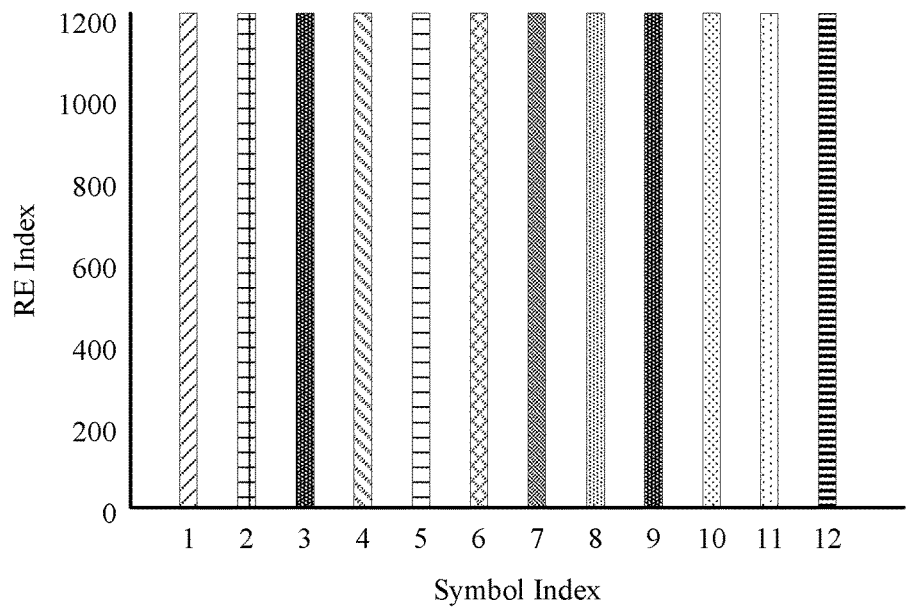

FIG. 2 illustrates an example of a frequency-first mapping 200 in accordance with aspects of the present disclosure. The frequency-first mapping 200, given an allocation size and modulation and coding scheme (MCS) such that a code block does not span more than one or two OFDM symbols, may take advantage of mostly frequency and layer diversity (e.g., in the case of a MIMO transmission with a rank greater than one). The frequency-first mapping 200 may not exploit time diversity since each code block may span a single OFDM symbol or a few OFDM symbols (e.g., one or two OFDM symbols in general). In FIG. 2, each code block may span a single OFDM symbol and may exploit frequency diversity at the expense of time diversity.

Figure 3:
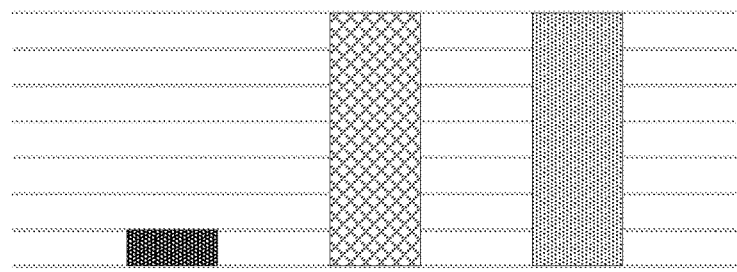
FIG. 3 illustrates an example of bar charts showing a comparison of diversities exploited by different mapping strategies in accordance with aspects of the present disclosure.
Figure 3:
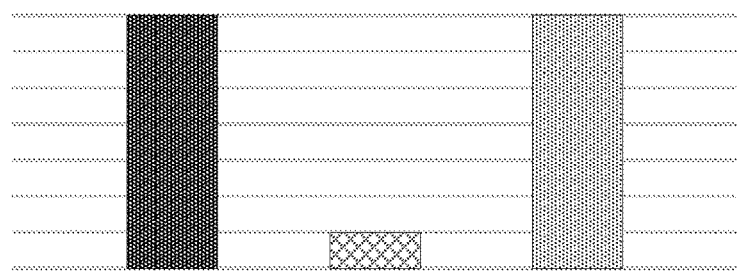
Figure 3:
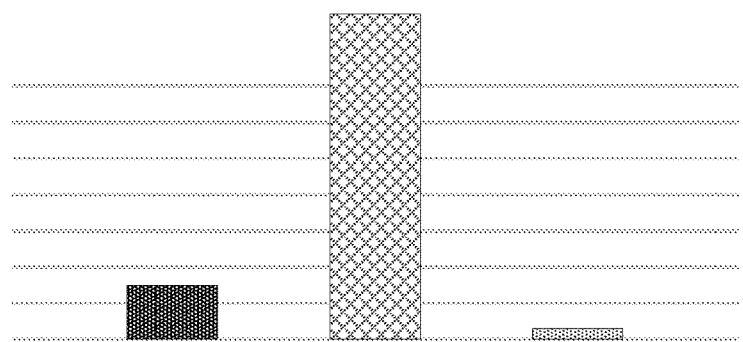

Other mapping strategies may increase diversity on one axis at the expense of diversity on one or more other axes. These other mapping types or strategies may achieve improved decoding probabilities (e.g., or link efficiency) when a most suitable mapping type is dynamically selected for different communication scenarios. FIG. 3 illustrates an example of bar charts 300 showing a comparison of diversities exploited by different mapping strategies in accordance with aspects of the present disclosure. In a first example 300-a, a mapping type or strategy may exploit frequency and layer diversity at the expense of time diversity. In a second example 300-b, a mapping type or strategy may exploit time and layer diversity at the expense of frequency diversity. In a third example 300-c, a mapping type or strategy may exploit frequency diversity at the expense of time and layer diversity.

Figure 4:
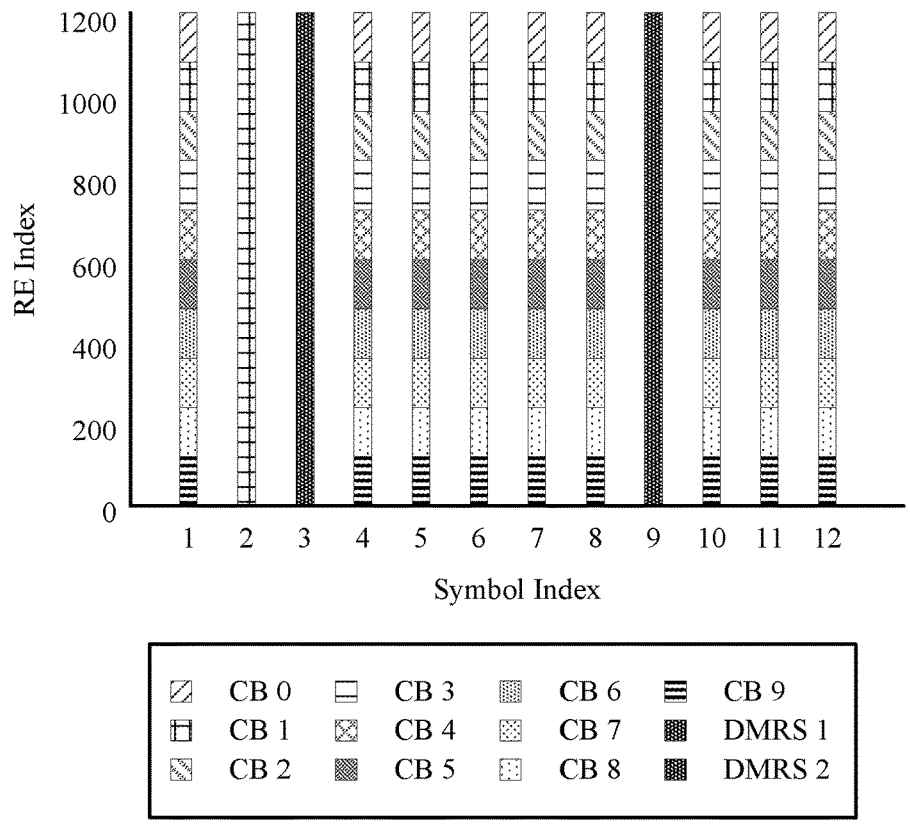
FIG. 4 illustrates an example of a time-first mapping in accordance with aspects of the present disclosure.
Figure 4:
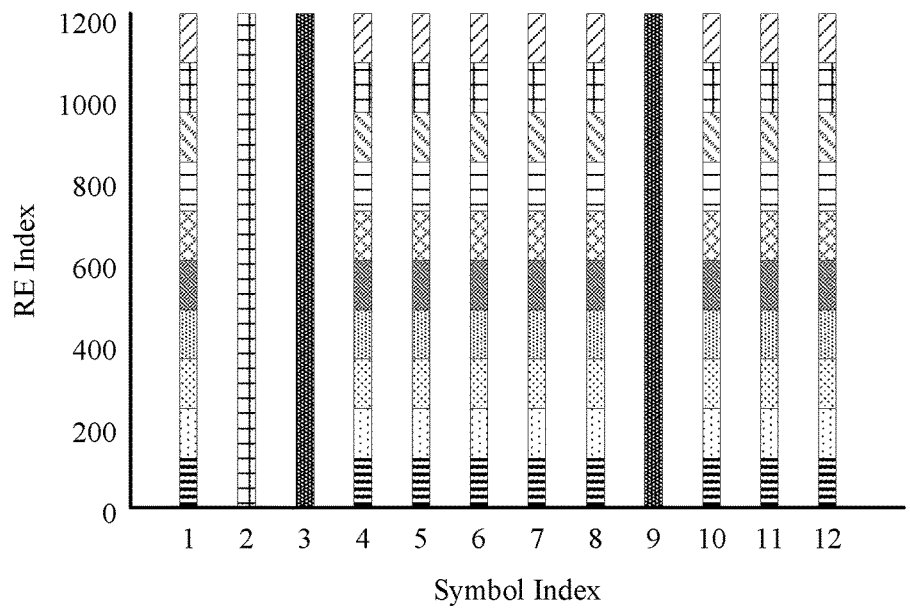

FIG. 4 illustrates an example of a time-first mapping 400 in accordance with aspects of the present disclosure. Compared to the frequency-first mapping in FIG. 2, the time-first mapping 400 may deprioritize frequency diversity in favor of time diversity while maintaining layer diversity (e.g., each code block may span two layers). In a high-mobility scenario, where a doppler spread is large, a transmitting device may benefit from a code block mapping which allows for increased time diversity.

Figure 5:
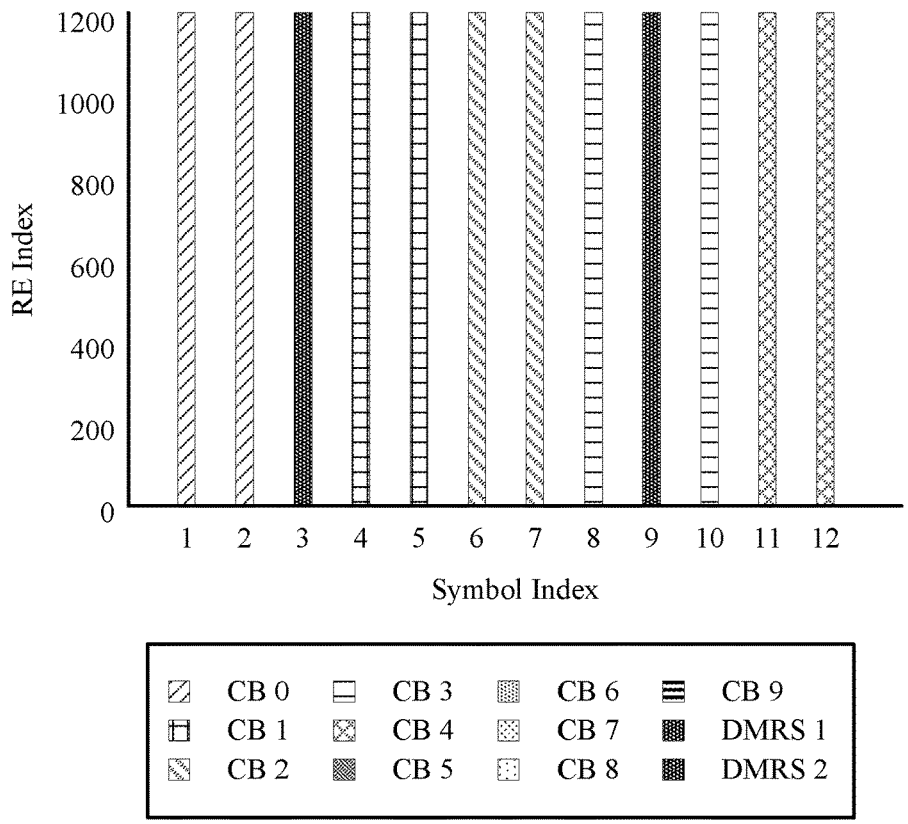
FIG. 5 illustrates an example of a frequency-first per layer mapping in accordance with aspects of the present disclosure.
Figure 5:
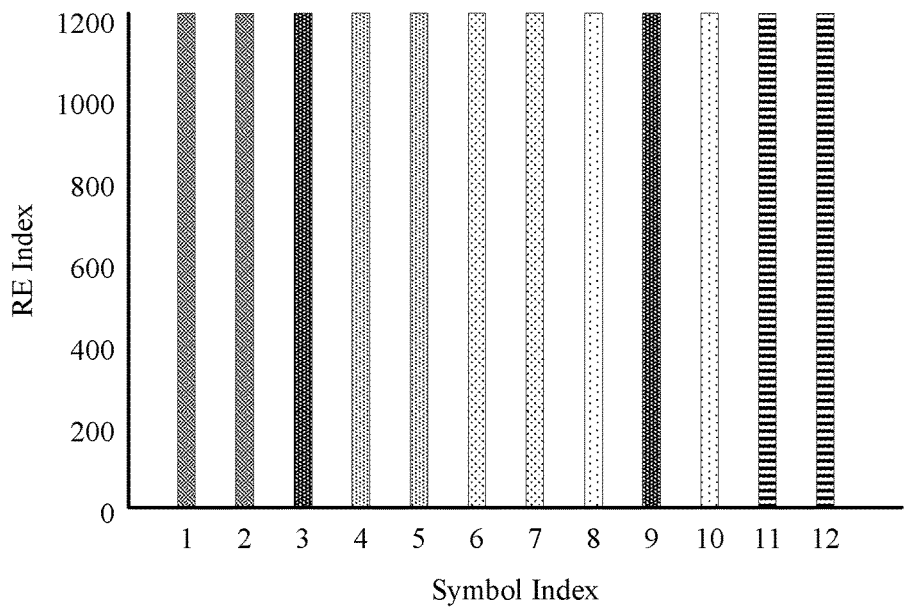

FIG. 5 illustrates an example of a frequency-first per layer mapping 500 in accordance with aspects of the present disclosure. Compared to the frequency-first mapping in FIG. 2, the frequency-first per layer mapping 500 may deprioritize layer diversity in favor of increased frequency diversity (e.g., and time diversity since each code block may span more symbols). In a high signal-to-noise ratio (SNR) and low mobility scenario, when a high MCS may be applicable, a layer imbalance may be small, and a transmitting device may benefit from a code block mapping approach that allows for enhanced frequency or time diversity at the expense of layer diversity.

Figure 6:
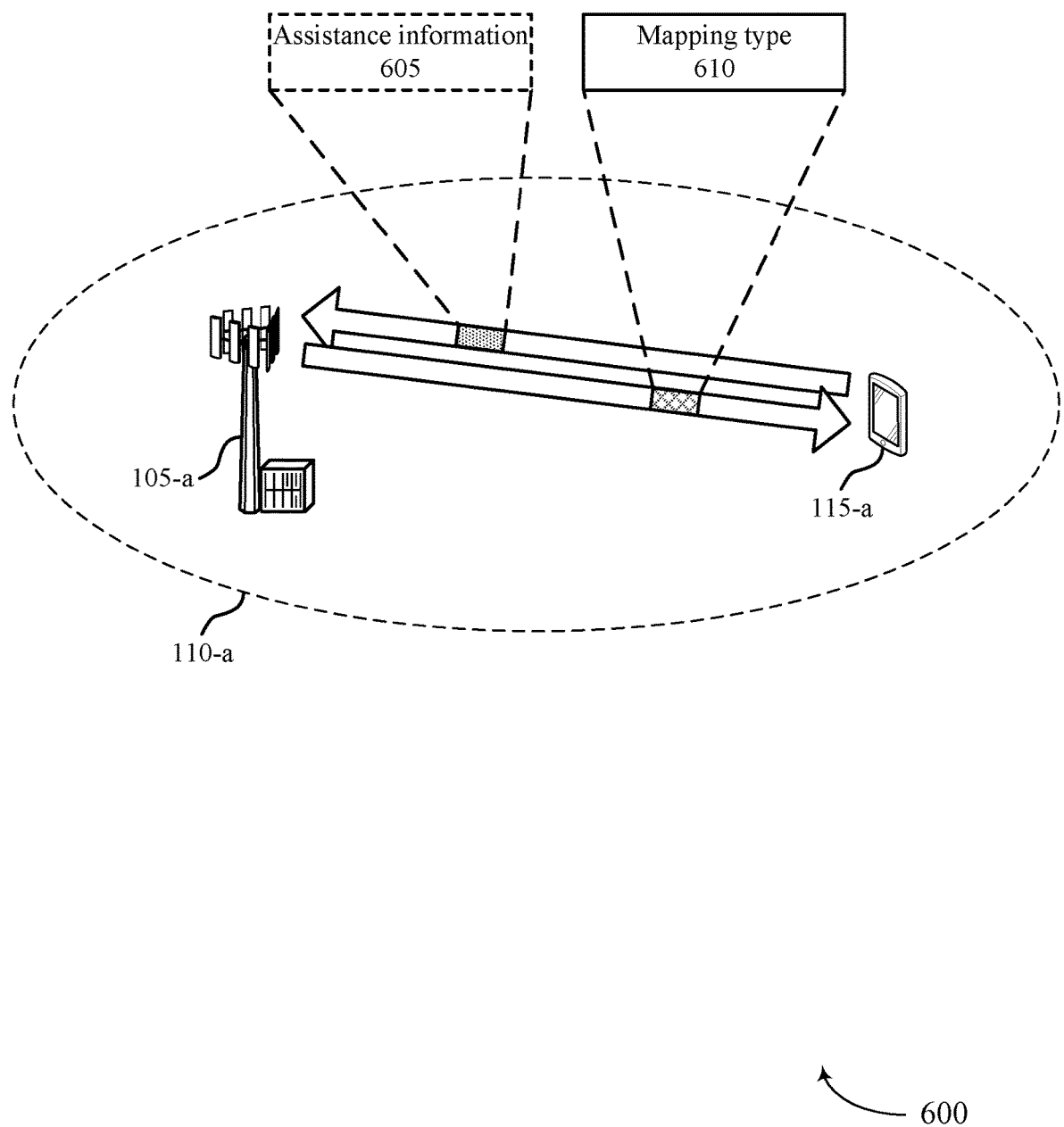
FIG. 6 illustrates an example of a wireless communications system that supports dynamic and adaptive code block mapping selection in accordance with aspects of the present disclosure.

FIG. 6 illustrates an example of a wireless communications system 600 that supports dynamic and adaptive code block mapping selection in accordance with aspects of the present disclosure. The wireless communications system 600 includes UE 115-a, which may be an example of a UE 115 described with reference to FIGS. 1-5. The wireless communications system 600 also includes base station 105-a, which may be an example of a base station 105 described with reference to FIGS. 1-5. The wireless communications system 600 may implement aspects of the wireless communications system 100. For example, to improve an alignment between a code block mapping type or strategy and a dominant diversity type or axis (e.g., frequency, time, or spatial diversity) for different channels and allocation scenarios, wireless communications system 600 may support efficient techniques for dynamic and adaptive code block mapping type selection. This improved alignment may result in improved link efficiency and reliability.

Base station 105-*a* may dynamically and adaptively determine a code block mapping type or strategy from multiple options (e.g., a frequency-first mapping type, a time-first mapping type, or a frequency-first per layer mapping type). Base station 105-*a* may select the code block mapping type based on an estimated channel characteristic in uplink (e.g., determined based on uplink transmissions from UE 115-*a*), based on assistance from UE 115-*a*, or based on measurements or estimations in downlink reported by UE 115-*a* (e.g., determined based on downlink transmissions from base station 105-*a*). That is, base station 105-*a* may select the code block mapping type with UE assistance or based on a UE recommendation (e.g., for downlink transmissions), or base station 105-*a* may select the code block mapping type without a UE recommendation. Base station 105-*a* may configure (e.g., via RRC signaling) UE 115-*a* with the options or possible code block mapping types or approaches based on the capabilities of UE 115-*a* (e.g., UE capabilities) to support a list of code block mapping types or strategies.

In some aspects, UE 115-*a* may transmit assistance information 605 to base station 105-*a* to assist base station 105-*a* in selecting a code block mapping type for communications between UE 115-*a* and base station 105-*a*. In some cases, UE assisted code block mapping type selection or reporting may be based on a last N downlink allocations. For instance, UE 115-*a* may select a code block mapping type to recommend to base station 105-*a* based on the last N downlink allocations, or base station 105-*a* may select the code block mapping type based on the last N downlink allocations. Additionally, or alternatively, UE 115-*a* may select a code block mapping type to recommend to base station 105-*a* based on one or more measurements or other information, or base station 105-*a* may select the code block mapping type based on the one or more measurements or other information. In some examples, UE 115-*a* may transmit a recommendation of a code bock mapping type to base station 105-*a* as part of a channel state feedback report. For instance, the channel state feedback report may have an additional field in order to signal the UE code block mapping type recommendation (e.g., for the UE recommendation-based flow).

The one or more measurements or other information used to select a code block mapping type may include measurements performed on channel state information reference signals (CSI-RSs) (e.g., allowing visibility of spectral characteristics of a channel and channel rank) or measurements performed on tracking reference signals (TRSs) (e.g., allowing doppler and delay spread estimation). The one or more measurements or other information may also include an estimation of a decoding probability for each code block from past allocations (e.g., the last N downlink allocations) or any deviations in decoding probability between code blocks (e.g., used as an indication of a non-optimal code block mapping strategy). The one or more measurements or other information may also include side information regarding impairments at UE 115-*a* (e.g., UE impairments based on a location of UE 115-*a*).

In other aspects, base station 105-*a* may support a network-driven adaptive code block mapping type selection. In particular, base station 105-*a* may select a code block mapping type for communications with UE 115-*a* without the assistance information 605 from UE 115-*a*. Although base station 105-*a* may select the code block mapping type without the assistance information 605, base station 105-*a* may still use other information from UE 115-*a* to select the code block mapping type. In particular, the network-driven adaptive code block mapping type selection may be based on different information or measurements. The different information or measurements may be associated with a transmission for which the code block mapping type is being selected or may be based on previous transmissions. In some cases, base station 105-*a* may select a code block mapping type based on a scheduling scenario or scheduling information associated with a transmission for which the code block mapping type is being selected. The scheduling scenario or scheduling information may include an allocation size, a data type and latency requirements, a transmit mode (e.g., a HST-SFN transmit mode with or without Doppler shift pre-compensation), an operational rank and MCS, or side information regarding a known interference (e.g., co-scheduled channels or UEs 115).

Base station 105-*a* may also select a code block mapping type based on a channel state feedback report for downlink, a sounding reference signal (SRS) based rank, or an MCS estimation for uplink. Base station 105-*a* may also select a code block mapping type based on a delay spread, Doppler spread, Doppler shift, or SNR measurements for uplink and downlink (e.g., or UE reports of SNR measurements). Base station 105-*a* may also select a code block mapping type based on an uplink code block decoding statistic, UE speed measurements (e.g., positioning-based measurements) or reports, or latency requirements for transmitted data. For instance, high latency requirements such as for URLLC, for example, may not allow a time-first mapping type which may require reception of all OFDM symbols to start a de-mapping process. Base station 105-*a* may select the code block mapping type based on the information or measurements described above to adaptively decide on a code block mapping type or approach for subsequent transmissions to UE 115-*a* (e.g., downlink) or from UE 115-*a* (e.g., uplink).

Once base station 105-*a* selects the mapping type for code block mapping, base station 105-*a* may transmit an indication 610 of the selected mapping type to UE 115-*a*. Base station 105-*a* may then communicate with UE 115-*a* based on the selected mapping type indicated to UE 115-*a*. For instance, base station 105-*a* may map code blocks to resources using the selected mapping type, and UE 115-*a* may de-map the code blocks from the resources based on the selected mapping type. Conversely, UE 115-*a* may map code blocks to resources using the selected mapping type, and base station 105-*a* may de-map the code blocks from the resources based on the selected mapping type.

In some cases, base station 105-*a* may transmit the indication 610 of the selected mapping type to UE 115-*a* per allocation via a scheduling DCI (e.g., a field for the selected mapping type may be included in the DCI). That is, the DCI used to schedule an uplink transmission or a downlink transmission may include a mapping type for the scheduled uplink transmission or downlink transmission. Additionally, or alternatively, base station 105-*a* may transmit the indication 610 of the selected mapping type in a MAC-CE. That is, base station 105-*a* may support MAC-CE based configuration or reconfiguration for code block mapping. The MAC-CE based configuration or reconfiguration for code block mapping may be suitable for cases where per-slot reconfiguration may not be appropriate. In some cases, the code block mapping type or option may be semi-statically configured for UE 115-*a* (e.g., based on a specific channel type or conditions, data type, and allocation size determined or assumed in advance). For instance, base station 105-*a* may transmit RRC signaling to UE 115-*a* with the indication 610 of the selected mapping type.

Figure 7:
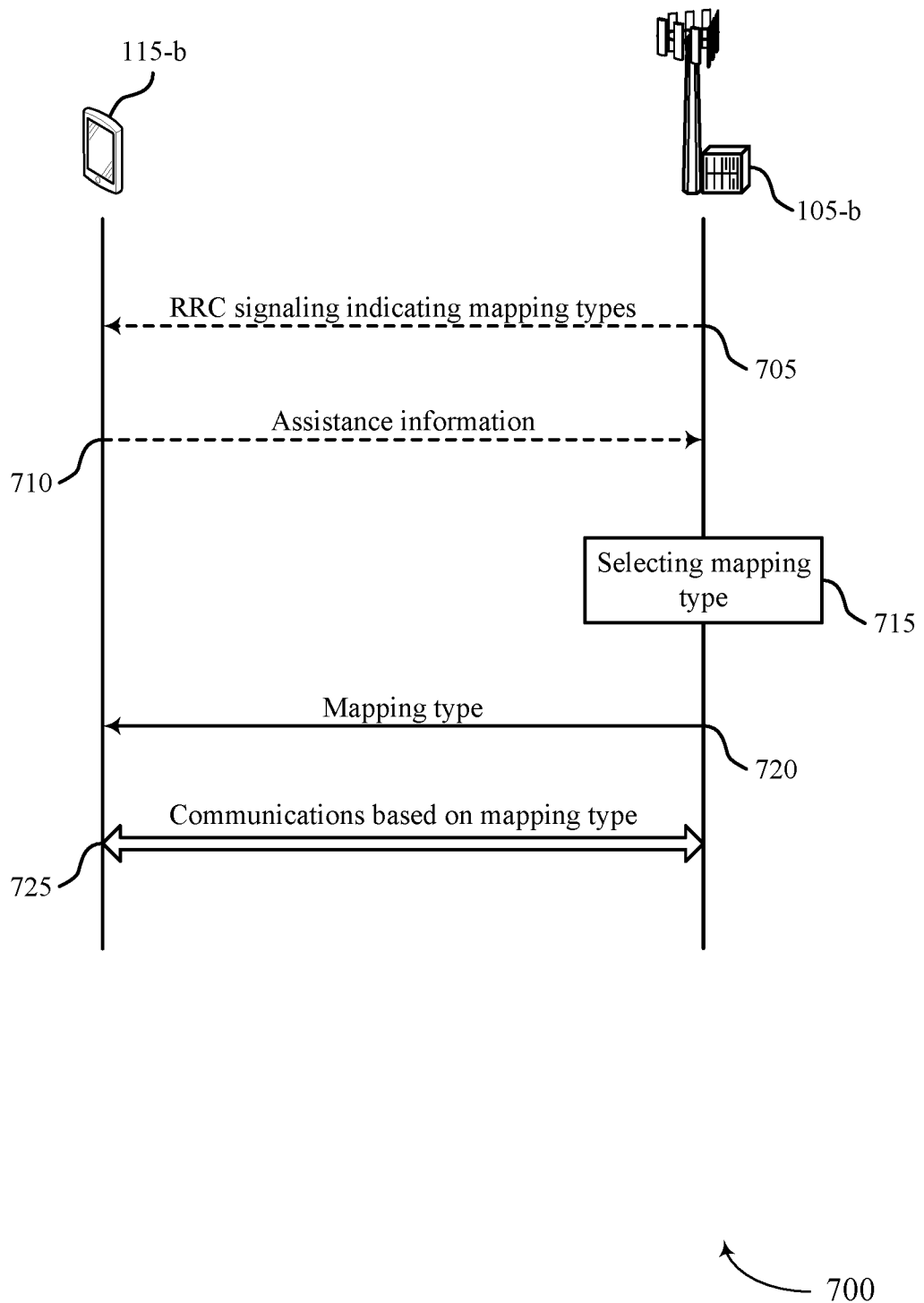
FIG. 7 illustrates an example of a process flow that supports dynamic and adaptive code block mapping selection in accordance with aspects of the present disclosure.

FIG. 7 illustrates an example of a process flow 700 that supports dynamic and adaptive code block mapping selection in accordance with aspects of the present disclosure. Process flow 700 includes UE 115-*b*, which may be an example of a UE 115 described with reference to FIGS. 1-6. Process flow 700 also includes base station 105-*b*, which may be an example of a base station 105 described with reference to FIGS. 1-6. The process flow 700 may implement aspects of wireless communications system 600. For example, the process flow 700 may support efficient techniques for dynamic and adaptive code block mapping type selection.

In the following description of the process flow 700, the signaling exchanged between UE 115-*b* and base station 105-*b* may be exchanged in a different order than the example order shown, or the operations performed by UE 115-*b* and base station 105-*b* may be performed in different orders or at different times. Some operations may also be omitted from the process flow 700, and other operations may be added to the process flow 700.

At 705, base station 105-*b* may transmit, and UE 115-*b* may receive, RRC signaling indicating a set of mapping types available for code block mapping. The set of mapping types may include a frequency-first mapping type, a time-first mapping type, or a frequency-first-per-layer mapping type.

At 710, UE 115-*b* may transmit, and base station 105-*b* may receive, assistance information for selecting from the set of mapping types available for code block mapping. In some examples, UE 115-*b* may select a mapping type from the set of mapping types available for code block mapping based on a metric of a channel between base station 105-*b* and UE 115-*b*. In such examples, the assistance information may be a recommendation of the selected mapping type, and UE 115-*b* may transmit the recommendation of the selected mapping type to base station 105-*b*. In other examples, the assistance information may be the metric of the channel between base station 105-*b* and UE 115-*b*, and UE 115-*b* may transmit the metric of the channel to base station 105-*b*.

The metric of the channel may include measurements performed on CSI-RSs, measurements performed on TRSs, an estimation of a decoding probability for each code block, or a metric of impairments at UE 115-*b*. In some cases, the assistance information may be based on a previous quantity of downlink allocations (e.g., a last N downlink allocations). In some cases, UE 115-*b* may transmit the assistance information in a channel state feedback report to base station 105-*b*. For instance, the channel state feedback report may include a field for the assistance information.

At 715, base station 105-*b* may select a mapping type from the set of mapping types available for code block mapping to use for communications with the UE 115-*b*. In some cases, base station 105-*b* may select the mapping type from the set of mapping types based on the assistance information received at 710. Additionally, or alternatively, base station 105-*b* may select the mapping type based on scheduling information for communications with UE 115-*b*, a channel state feedback report for downlink, an SRS based rank, an MCS estimation for uplink, a delay spread, a Doppler spread, SNR measurements, an uplink code block decoding statistic, UE speed measurements or reports, or latency requirements for communications with UE 115-*b*.

At 720, base station 105-*b* may transmit, and UE 115-*b* may receive, an indication of the selected mapping type for code block mapping. In some cases, base station 105-*b* may transmit, and UE 115-*b* may receive, the indication of the selected mapping type for code block mapping in DCI, a MAC-CE, or RRC signaling.

At 725, UE 115-*b* may communicate with base station 105-*b* based on the selected mapping type for code block mapping. For instance, UE 115-*b* or base station 105-*b* may map one or more code blocks to a set of resources based on the selected mapping type, and UE 115-*b* or base station 105-*b* may transmit the one or more code blocks on the set of resources based on the mapping. Additionally, or alternatively, UE 115-*b* or base station 105-*b* may receive one or more code blocks mapped to a set of resources, and UE 115-*b* or base station 105-*b* may de-map the one or more code blocks from the set of resources based on the selected mapping type.

Figure 8:
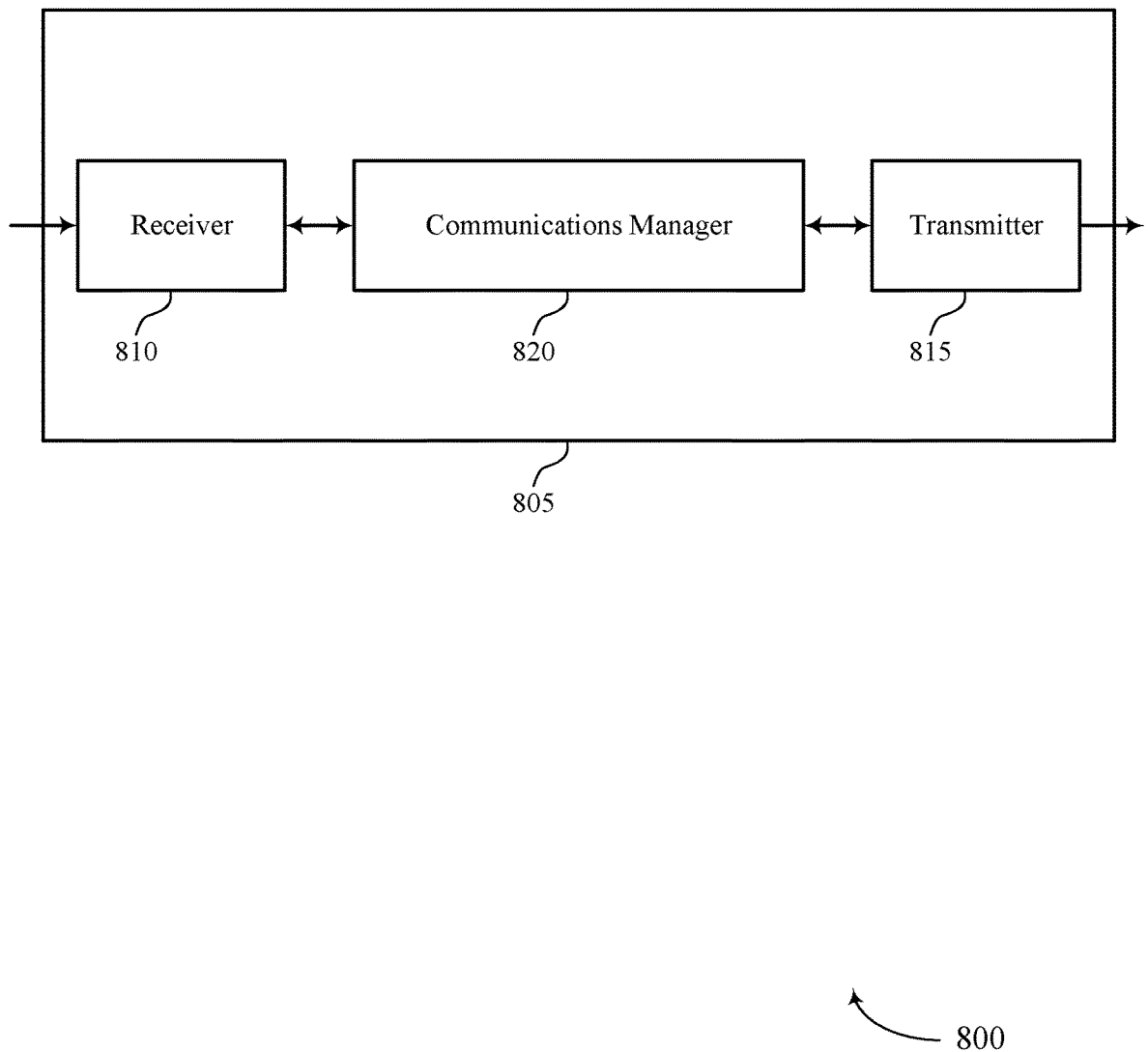
FIGS. 8 and 9 show block diagrams of devices that support dynamic and adaptive code block mapping selection in accordance with aspects of the present disclosure.

FIG. 8 shows a block diagram 800 of a device 805 that supports dynamic and adaptive code block mapping selection in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to dynamic and adaptive code block mapping selection). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dynamic and adaptive code block mapping selection). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of dynamic and adaptive code block mapping selection as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for transmitting, to a base station, assistance information for selecting from a set of multiple mapping types available for code block mapping. The communications manager 820 may be configured as or otherwise support a means for receiving, from the base station based on transmitting the assistance information, an indication of a selected mapping type for code block mapping. The communications manager 820 may be configured as or otherwise support a means for communicating with the base station based on the selected mapping type for code block mapping.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources. In particular, a base station may dynamically select a code block mapping type to use for code block mapping for communications with a UE. As such, the base station and the UE may be able to adapt a code block mapping type to a dominant diversity type to improve throughput and reliability in a wireless communications system, resulting in a more efficient utilization of communication resources.

Figure 9:
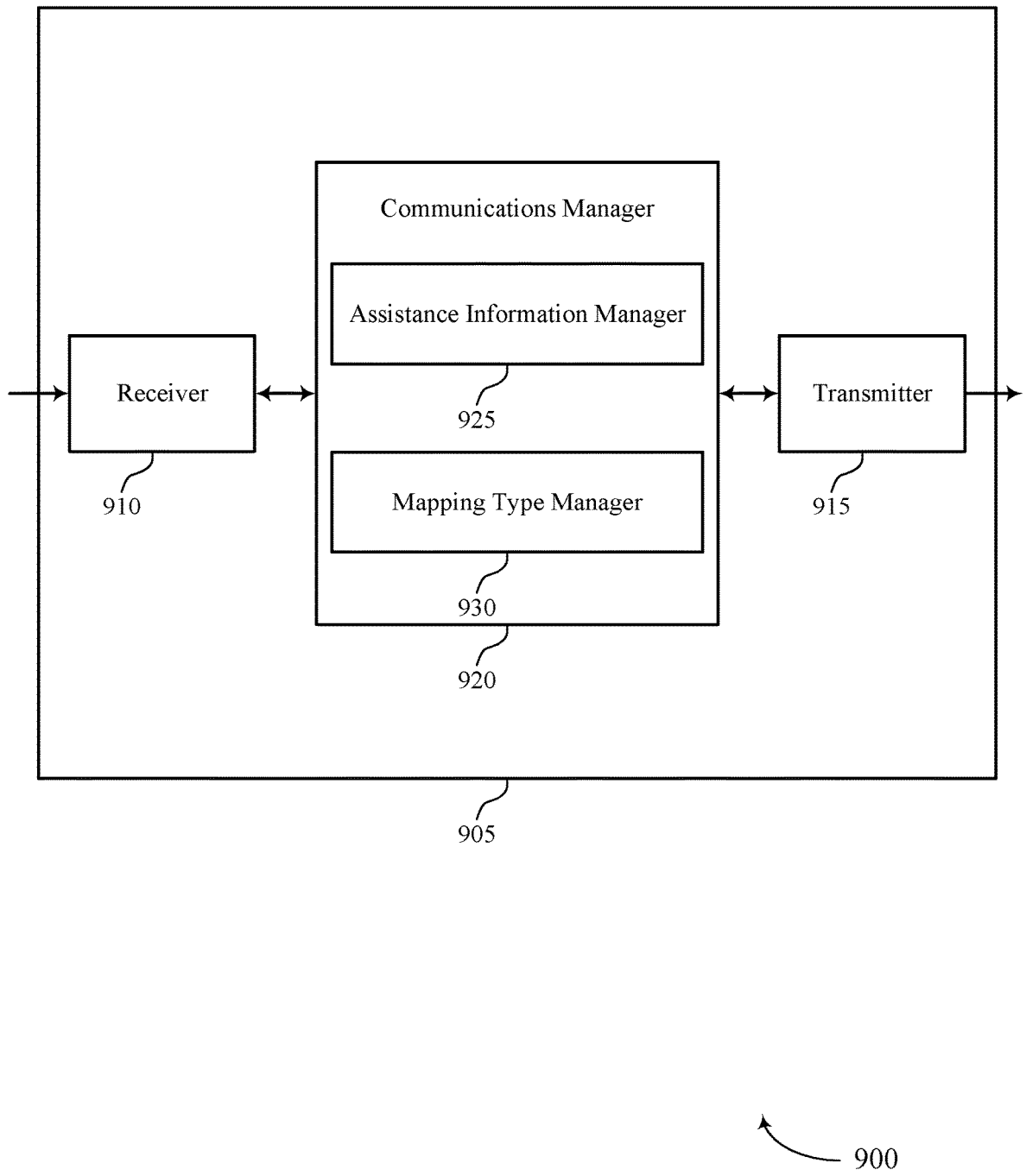

FIG. 9 shows a block diagram 900 of a device 905 that supports dynamic and adaptive code block mapping selection in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic and adaptive code block mapping selection). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dynamic and adaptive code block mapping selection). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of dynamic and adaptive code block mapping selection as described herein. For example, the communications manager 920 may include an assistance information manager 925 a mapping type manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The assistance information manager 925 may be configured as or otherwise support a means for transmitting, to a base station, assistance information for selecting from a set of multiple mapping types available for code block mapping. The mapping type manager 930 may be configured as or otherwise support a means for receiving, from the base station based on transmitting the assistance information, an indication of a selected mapping type for code block mapping. The mapping type manager 930 may be configured as or otherwise support a means for communicating with the base station based on the selected mapping type for code block mapping.

Figure 10:
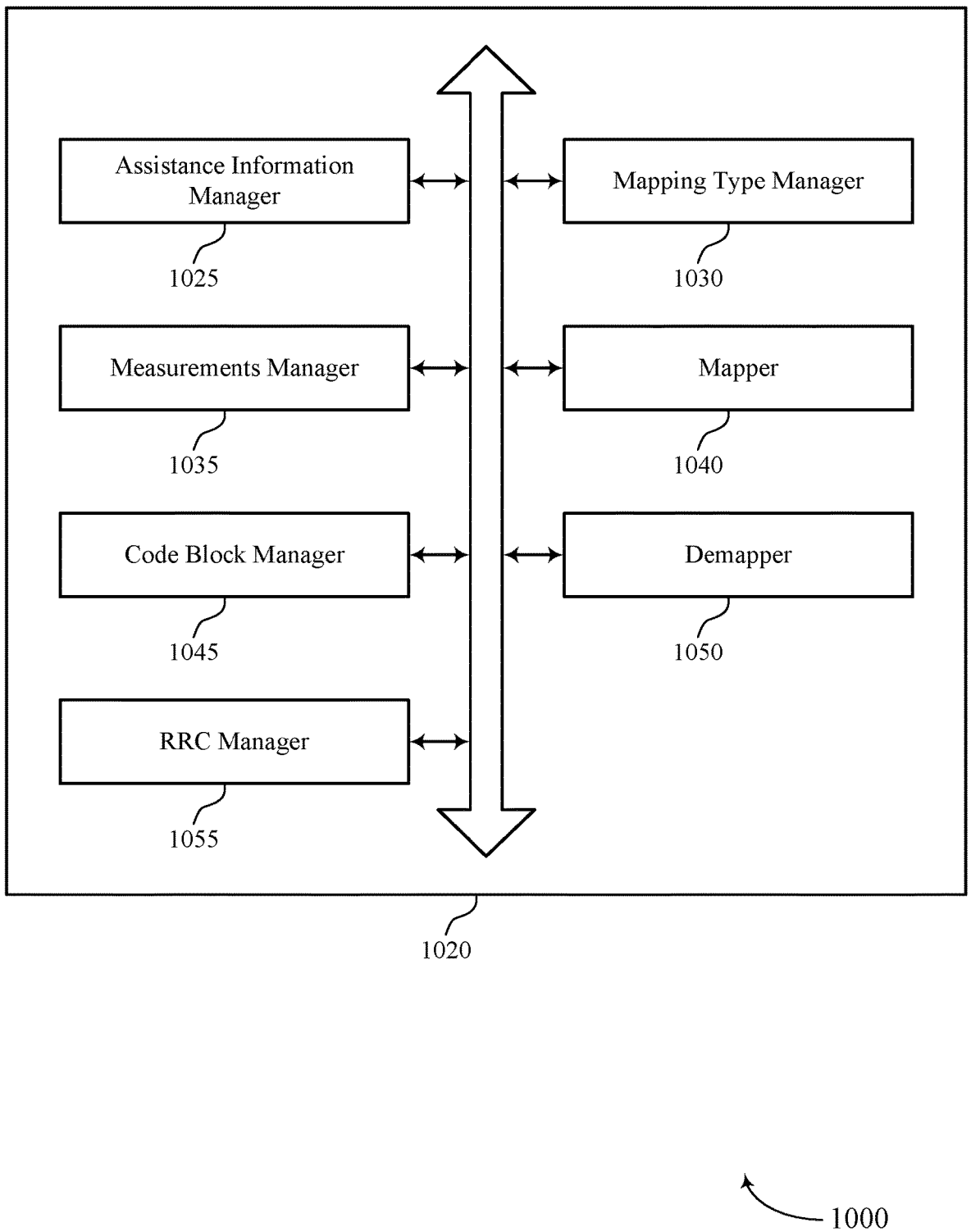
FIG. 10 shows a block diagram of a communications manager that supports dynamic and adaptive code block mapping selection in accordance with aspects of the present disclosure.

FIG. 10 shows a block diagram 1000 of a communications manager 1020 that supports dynamic and adaptive code block mapping selection in accordance with aspects of the present disclosure. The communications manager 1020 may be an example of aspects of a communications manager 820, a communications manager 920, or both, as described herein. The communications manager 1020, or various components thereof, may be an example of means for performing various aspects of dynamic and adaptive code block mapping selection as described herein. For example, the communications manager 1020 may include an assistance information manager 1025, a mapping type manager 1030, a measurements manager 1035, a mapper 1040, a code block manager 1045, a demapper 1050, an RRC manager 1055, or any combination thereof. Each of these components may communicate, directly or indirectly, with one another (e.g., via one or more buses).

The communications manager 1020 may support wireless communication at a UE in accordance with examples as disclosed herein. The assistance information manager 1025 may be configured as or otherwise support a means for transmitting, to a base station, assistance information for selecting from a set of multiple mapping types available for code block mapping. The mapping type manager 1030 may be configured as or otherwise support a means for receiving, from the base station based on transmitting the assistance information, an indication of a selected mapping type for code block mapping. In some examples, the mapping type manager 1030 may be configured as or otherwise support a means for communicating with the base station based on the selected mapping type for code block mapping.

In some examples, to support transmitting the assistance information, the mapping type manager 1030 may be configured as or otherwise support a means for selecting the mapping type from the set of multiple mapping types available for code block mapping based on a metric of a channel between the base station and the UE and transmitting, to the base station, a recommendation of the selected mapping type.

In some examples, the metric of the channel includes measurements performed on channel state information reference signals, measurements performed on tracking reference signals, an estimation of a decoding probability for each code block, a metric of impairments at the UE, or a combination thereof.

In some examples, the RRC manager 1055 may be configured as or otherwise support a means for receiving, from the base station, radio resource control signaling indicating the set of multiple mapping types from which the UE is to select the mapping type for the recommendation.

In some examples, to support transmitting the assistance information, the measurements manager 1035 may be configured as or otherwise support a means for transmitting, to the base station, measurements performed on channel state information reference signals, measurements performed on tracking reference signals, an estimation of a decoding probability for each code block, an indication of impairments at the UE, or a combination thereof.

In some examples, the assistance information is based on a previous quantity of downlink allocations.

In some examples, the set of multiple mapping types includes a frequency-first mapping type, a time-first mapping type, a frequency-first-per-layer mapping type, or a combination thereof.

In some examples, to support receiving the indication of the selected mapping type for code block mapping, the mapping type manager 1030 may be configured as or otherwise support a means for receiving the indication of the selected mapping type for code block mapping in downlink control information, a medium access control control element, or radio resource control signaling.

In some examples, to support transmitting the assistance information, the assistance information manager 1025 may be configured as or otherwise support a means for transmitting the assistance information in a channel state feedback report to the base station.

In some examples, the channel state feedback report includes a field for the assistance information.

In some examples, to support communicating with the base station based on the selected mapping type, the mapper 1040 may be configured as or otherwise support a means for mapping one or more code blocks to a set of resources based on the selected mapping type. In some examples, to support communicating with the base station based on the selected mapping type, the code block manager 1045 may be configured as or otherwise support a means for transmitting, to the base station, the one or more code blocks on the set of resources based on the mapping.

In some examples, to support communicating with the base station based on the selected mapping type, the code block manager 1045 may be configured as or otherwise support a means for receiving, from the base station, one or more code blocks mapped to a set of resources. In some examples, to support communicating with the base station based on the selected mapping type, the demapper 1050 may be configured as or otherwise support a means for demapping the one or more code blocks from the set of resources based on the selected mapping type.

Figure 11:
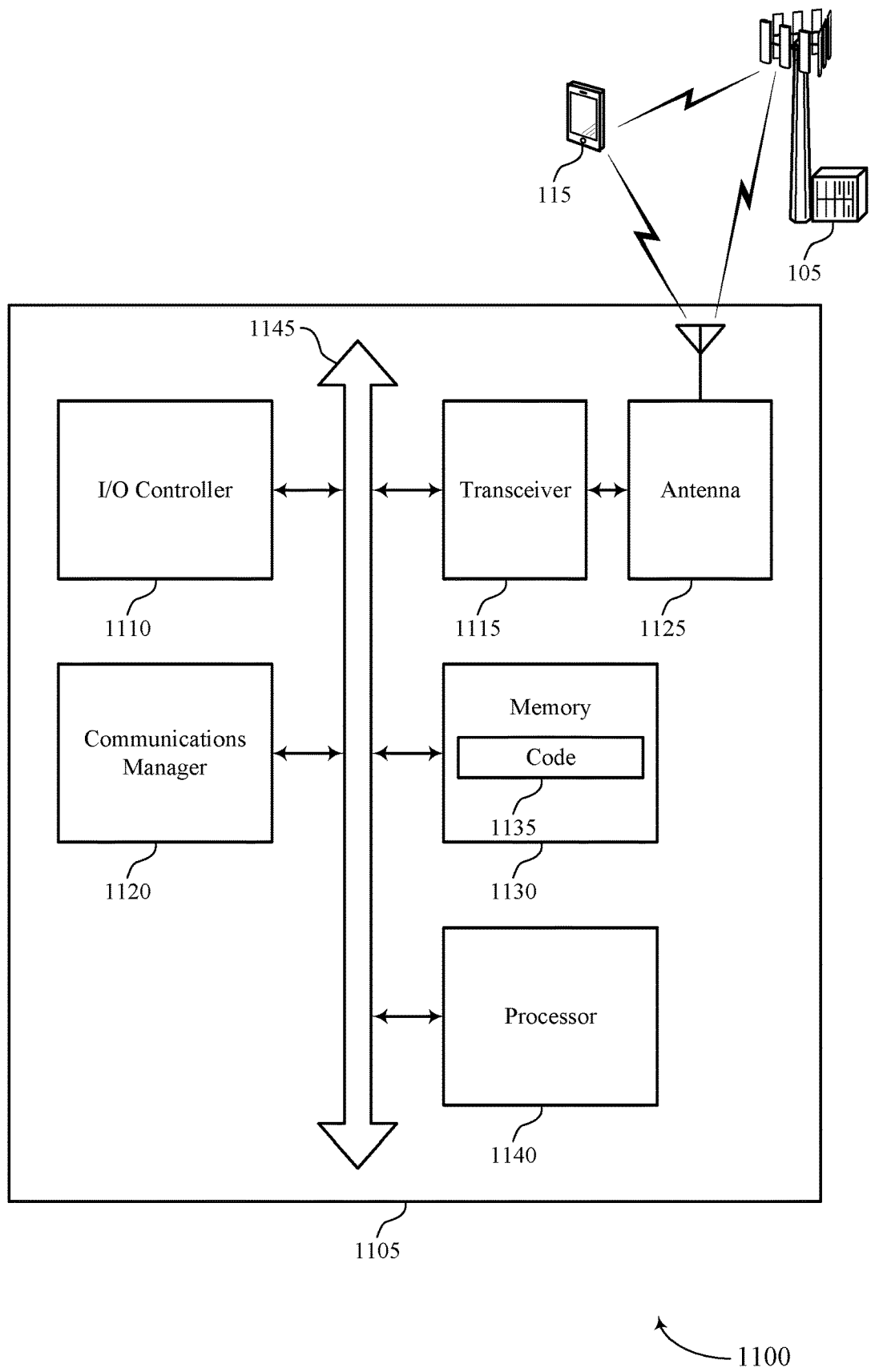
FIG. 11 shows a diagram of a system including a device that supports dynamic and adaptive code block mapping selection in accordance with aspects of the present disclosure.

FIG. 11 shows a diagram of a system 1100 including a device 1105 that supports dynamic and adaptive code block mapping selection in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting dynamic and adaptive code block mapping selection). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for transmitting, to a base station, assistance information for selecting from a set of multiple mapping types available for code block mapping. The communications manager 1120 may be configured as or otherwise support a means for receiving, from the base station based on transmitting the assistance information, an indication of a selected mapping type for code block mapping. The communications manager 1120 may be configured as or otherwise support a means for communicating with the base station based on the selected mapping type for code block mapping.

By including or configuring the communications manager 1120 in accordance with examples as described herein, the device 1105 may support techniques for more efficient utilization of communication resources. In particular, a base station may dynamically select a code block mapping type to use for code block mapping for communications with a UE. As such, the base station and the UE may be able to adapt a code block mapping type to a dominant diversity type to improve throughput and reliability in a wireless communications system, resulting in a more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of dynamic and adaptive code block mapping selection as described herein, or the processor 1140 and the memory 1130 may be otherwise configured to perform or support such operations.

Figure 12:
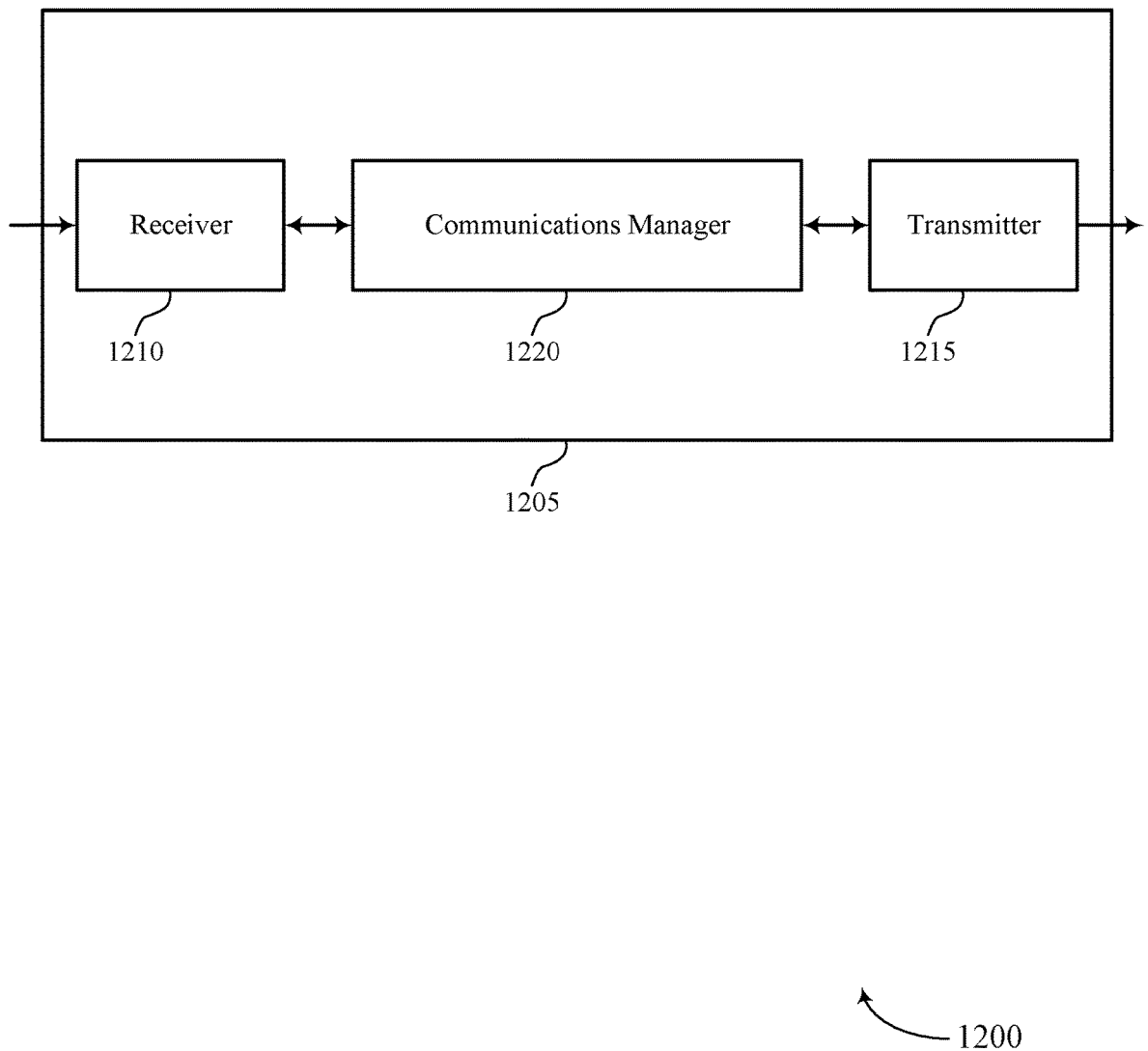
FIGS. 12 and 13 show block diagrams of devices that support dynamic and adaptive code block mapping selection in accordance with aspects of the present disclosure.

FIG. 12 shows a block diagram 1200 of a device 1205 that supports dynamic and adaptive code block mapping selection in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to dynamic and adaptive code block mapping selection). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to dynamic and adaptive code block mapping selection). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of dynamic and adaptive code block mapping selection as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for selecting a mapping type from a set of multiple mapping types available for code block mapping to use for communications with a UE. The communications manager 1220 may be configured as or otherwise support a means for transmitting, to the UE, an indication of the selected mapping type for code block mapping. The communications manager 1220 may be configured as or otherwise support a means for communicating with the UE based on the selected mapping type for code block mapping.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for more efficient utilization of communication resources. In particular, a base station may dynamically select a code block mapping type to use for code block mapping for communications with a UE. As such, the base station and the UE may be able to adapt a code block mapping type to a dominant diversity type to improve throughput and reliability in a wireless communications system, resulting in a more efficient utilization of communication resources.

Figure 13:
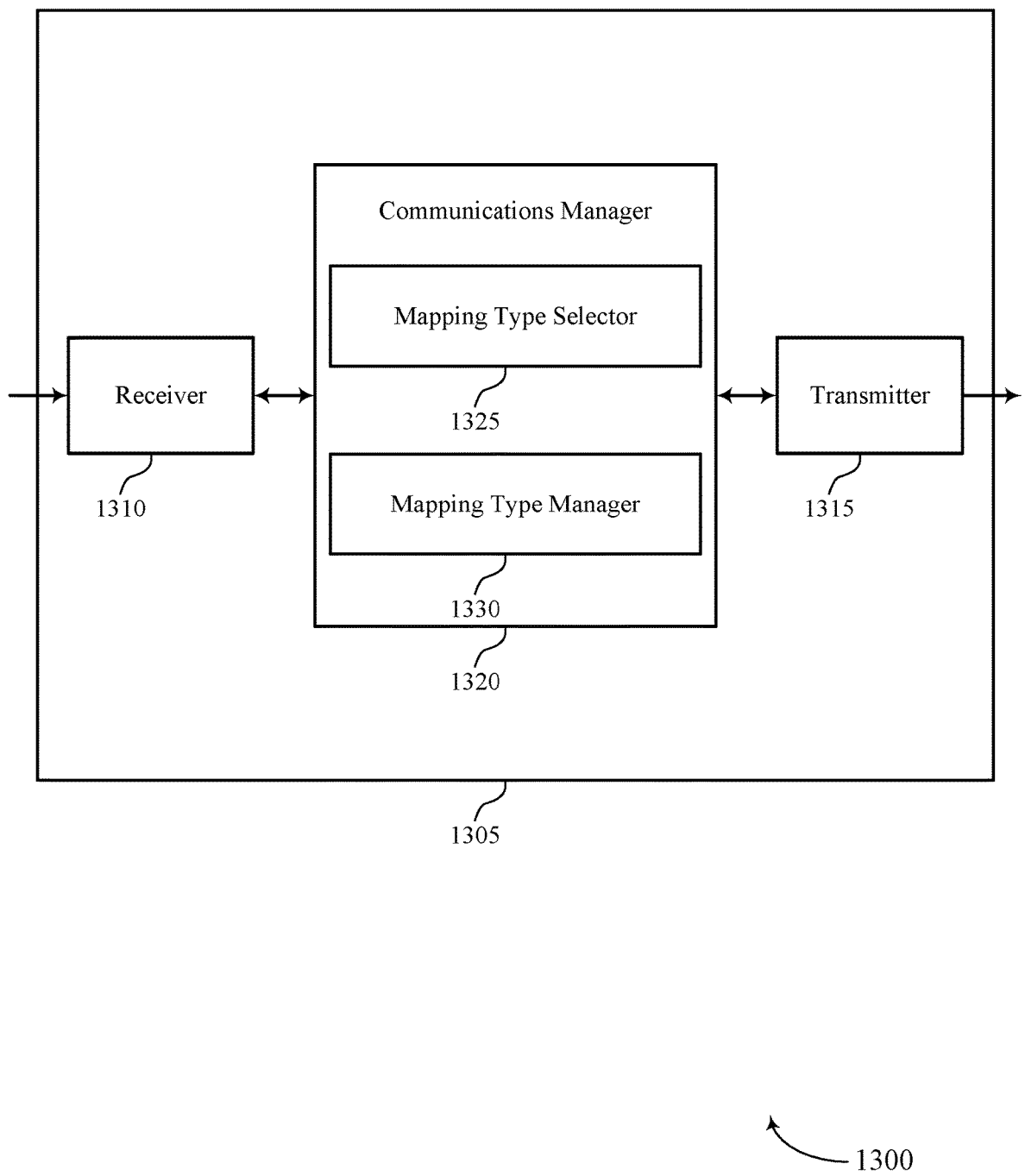

FIG. 13 shows a block diagram 1300 of a device 1305 that supports dynamic and adaptive code block mapping selection in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to dynamic and adaptive code block mapping selection). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to dynamic and adaptive code block mapping selection). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of dynamic and adaptive code block mapping selection as described herein. For example, the communications manager 1320 may include a mapping type selector 1325 a mapping type manager 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The mapping type selector 1325 may be configured as or otherwise support a means for selecting a mapping type from a set of multiple mapping types available for code block mapping to use for communications with a UE. The mapping type manager 1330 may be configured as or otherwise support a means for transmitting, to the UE, an indication of the selected mapping type for code block mapping. The mapping type manager 1330 may be configured as or otherwise support a means for communicating with the UE based on the selected mapping type for code block mapping.

Figure 14:
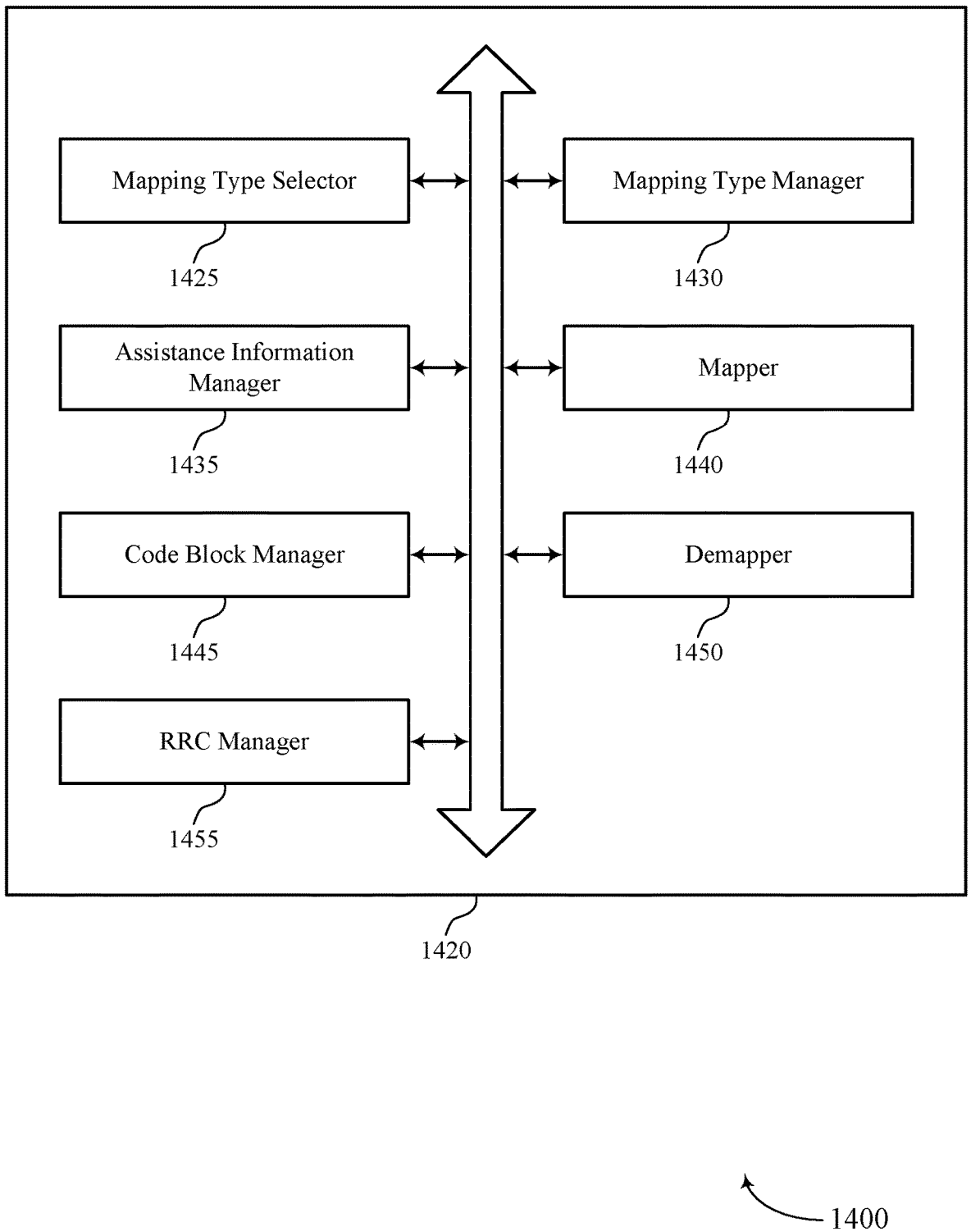
FIG. 14 shows a block diagram of a communications manager that supports dynamic and adaptive code block mapping selection in accordance with aspects of the present disclosure.

FIG. 14 shows a block diagram 1400 of a communications manager 1420 that supports dynamic and adaptive code block mapping selection in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of dynamic and adaptive code block mapping selection as described herein. For example, the communications manager 1420 may include a mapping type selector 1425, a mapping type manager 1430, an assistance information manager 1435, a mapper 1440, a code block manager 1445, a demapper 1450, an RRC manager 1455, or any combination thereof. Each of these components may communicate, directly or indirectly, with one another (e.g., via one or more buses).

The communications manager 1420 may support wireless communication at a base station in accordance with examples as disclosed herein. The mapping type selector 1425 may be configured as or otherwise support a means for selecting a mapping type from a set of multiple mapping types available for code block mapping to use for communications with a UE. The mapping type manager 1430 may be configured as or otherwise support a means for transmitting, to the UE, an indication of the selected mapping type for code block mapping. In some examples, the mapping type manager 1430 may be configured as or otherwise support a means for communicating with the UE based on the selected mapping type for code block mapping.

In some examples, to support selecting the mapping type, the mapping type selector 1425 may be configured as or otherwise support a means for selecting the mapping type from the set of multiple mapping types based on scheduling information for the communications with the UE, a channel state feedback report for downlink, a sounding reference signal based rank, a modulation and coding scheme estimation for uplink, a delay spread, a doppler spread, signal-tonoise ratio measurements, an uplink code block decoding statistic, UE speed measurements or reports, latency requirements for the communications with the UE, or a combination thereof.

In some examples, to support selecting the mapping type, the assistance information manager 1435 may be configured as or otherwise support a means for receiving, from the UE, assistance information for selecting the mapping type from the set of multiple mapping types available for code block mapping, where selecting the mapping type includes. In some examples, to support selecting the mapping type, the mapping type selector 1425 may be configured as or otherwise support a means for selecting the mapping type from the set of multiple mapping types based on the assistance information.

In some examples, the assistance information includes a recommendation of the selected mapping type for code block mapping.

In some examples, the RRC manager 1455 may be configured as or otherwise support a means for transmitting, to the UE, radio resource control signaling indicating the set of multiple mapping types from which the UE is to select the mapping type for the recommendation.

In some examples, the assistance information includes measurements performed on channel state information reference signals, measurements performed on tracking reference signals, an estimation of a decoding probability for each code block, an indication of impairments at the UE, or a combination thereof.

In some examples, the assistance information is based on a previous quantity of downlink allocations.

In some examples, to support receiving the assistance information, the assistance information manager 1435 may be configured as or otherwise support a means for receiving the assistance information in a channel state feedback report to the base station.

In some examples, the channel state feedback report includes a field for the assistance information.

In some examples, the set of multiple mapping types includes a frequency-first mapping type, a time-first mapping type, or a frequency-first-per-layer mapping type.

In some examples, to support transmitting the indication of the selected mapping type for code block mapping, the mapping type manager 1430 may be configured as or otherwise support a means for transmitting the indication of the selected mapping type for code block mapping in downlink control information, a medium access control control element, or radio resource control signaling.

In some examples, to support communicating with the UE based on the selected mapping type, the mapper 1440 may be configured as or otherwise support a means for mapping one or more code blocks to a set of resources based on the selected mapping type. In some examples, to support communicating with the UE based on the selected mapping type, the code block manager 1445 may be configured as or otherwise support a means for transmitting, to the UE, the one or more code blocks on the set of resources based on the mapping.

In some examples, to support communicating with the UE based on the selected mapping type, the code block manager 1445 may be configured as or otherwise support a means for receiving, from the UE, one or more code blocks mapped to a set of resources. In some examples, to support communicating with the UE based on the selected mapping type, the demapper 1450 may be configured as or otherwise support a means for de-mapping the one or more code blocks from the set of resources based on the selected mapping type.

Figure 15:
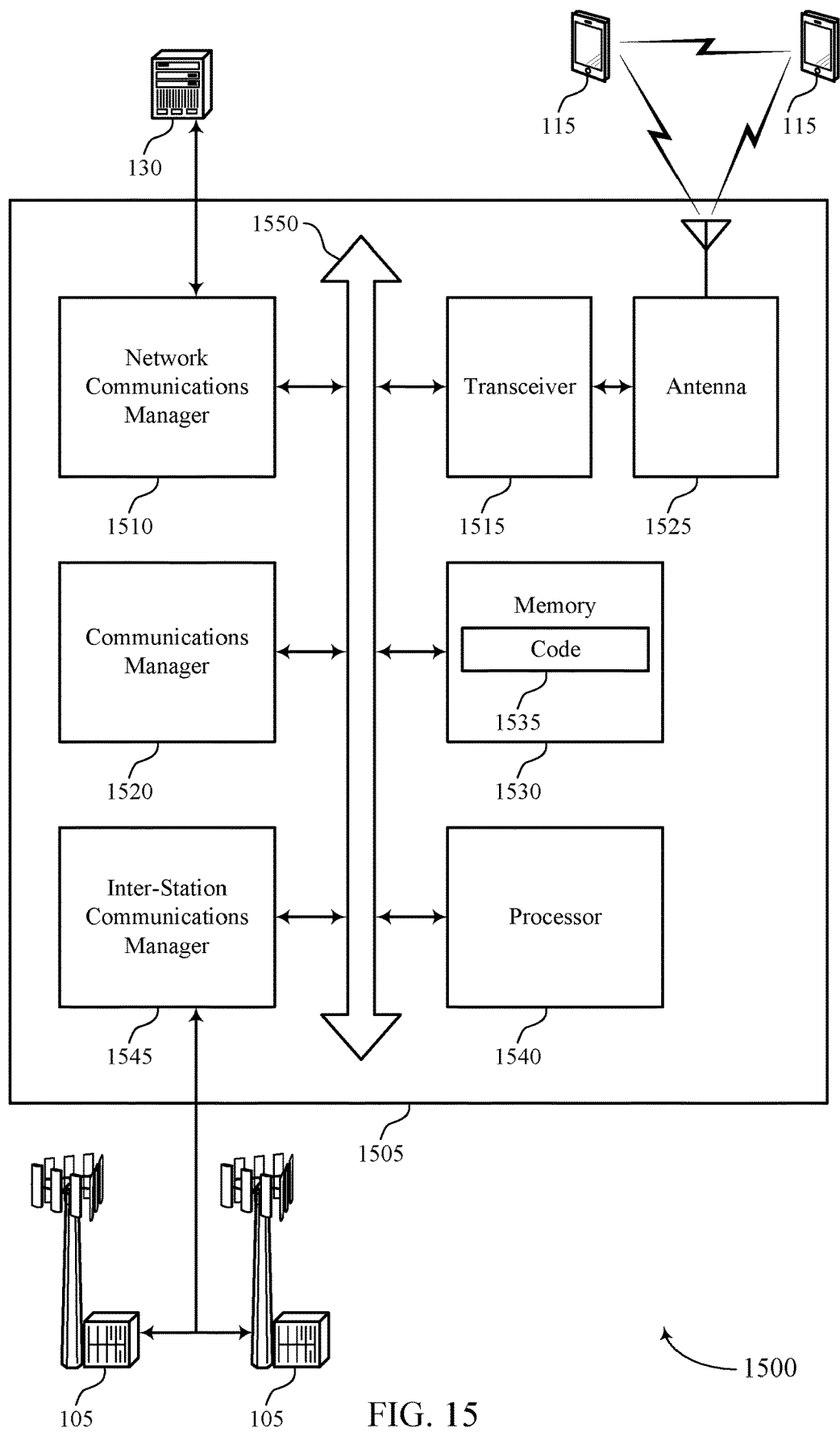
FIG. 15 shows a diagram of a system including a device that supports dynamic and adaptive code block mapping selection in accordance with aspects of the present disclosure.

FIG. 15 shows a diagram of a system 1500 including a device 1505 that supports dynamic and adaptive code block mapping selection in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting dynamic and adaptive code block mapping selection). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for selecting a mapping type from a set of multiple mapping types available for code block mapping to use for communications with a UE. The communications manager 1520 may be configured as or otherwise support a means for transmitting, to the UE, an indication of the selected mapping type for code block mapping. The communications manager 1520 may be configured as or otherwise support a means for communicating with the UE based on the selected mapping type for code block mapping.

By including or configuring the communications manager 1520 in accordance with examples as described herein, the device 1505 may support techniques for more efficient utilization of communication resources. In particular, a base station may dynamically select a code block mapping type to use for code block mapping for communications with a UE. As such, the base station and the UE may be able to adapt a code block mapping type to a dominant diversity type to improve throughput and reliability in a wireless communications system, resulting in a more efficient utilization of communication resources.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of dynamic and adaptive code block mapping selection as described herein, or the processor 1540 and the memory 1530 may be otherwise configured to perform or support such operations.

Figure 16:
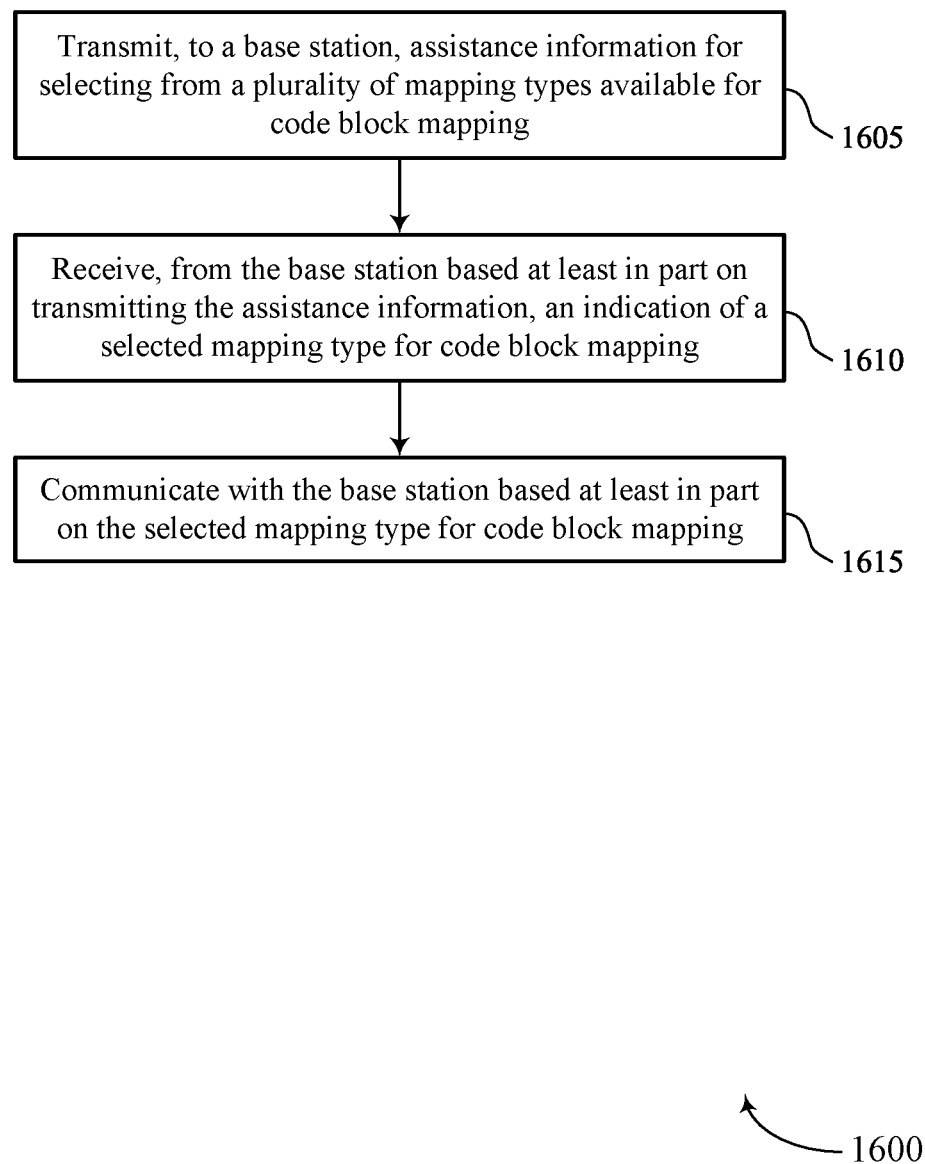
FIGS. 16 and 17 show flowcharts illustrating methods that support dynamic and adaptive code block mapping selection in accordance with aspects of the present disclosure.

FIG. 16 shows a flowchart illustrating a method 1600 that supports dynamic and adaptive code block mapping selection in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting, to a base station, assistance information for selecting from a set of multiple mapping types available for code block mapping. The operations of 1605 may be performed in accordance with examples as disclosed herein. In some examples, aspects of the operations of 1605 may be performed by an assistance information manager 1025 as described with reference to FIG. 10.

At 1610, the method may include receiving, from the base station based on transmitting the assistance information, an indication of a selected mapping type for code block mapping. The operations of 1610 may be performed in accordance with examples as disclosed herein. In some examples, aspects of the operations of 1610 may be performed by a mapping type manager 1030 as described with reference to FIG. 10.

At 1615, the method may include communicating with the base station based on the selected mapping type for code block mapping. The operations of 1615 may be performed in accordance with examples as disclosed herein. In some examples, aspects of the operations of 1615 may be performed by a mapping type manager 1030 as described with reference to FIG. 10.

Figure 17:
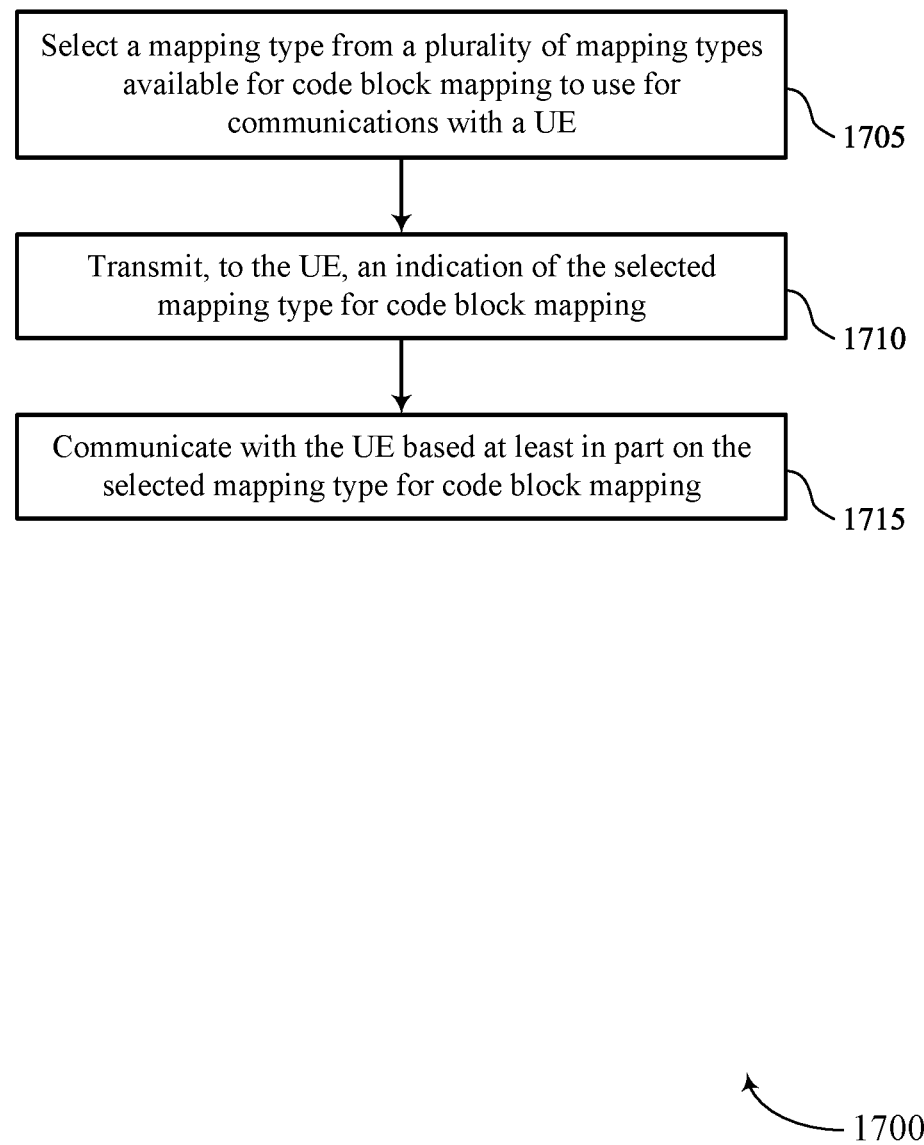

FIG. 17 shows a flowchart illustrating a method 1700 that supports dynamic and adaptive code block mapping selection in accordance with aspects of the present disclosure. The operations of the method 1700 may be implemented by a base station or its components as described herein. For example, the operations of the method 1700 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1705, the method may include selecting a mapping type from a set of multiple mapping types available for code block mapping to use for communications with a UE. The operations of 1705 may be performed in accordance with examples as disclosed herein. In some examples, aspects of the operations of 1705 may be performed by a mapping type selector 1425 as described with reference to FIG. 14.

At 1710, the method may include transmitting, to the UE, an indication of the selected mapping type for code block mapping. The operations of 1710 may be performed in accordance with examples as disclosed herein. In some examples, aspects of the operations of 1710 may be performed by a mapping type manager 1430 as described with reference to FIG. 14.

At 1715, the method may include communicating with the UE based on the selected mapping type for code block mapping. The operations of 1715 may be performed in accordance with examples as disclosed herein. In some examples, aspects of the operations of 1715 may be performed by a mapping type manager 1430 as described with reference to FIG. 14.

The following provides an overview of aspects of the present disclosure:

Aspect 1: A method for wireless communication at a UE, comprising: transmitting, to a base station, assistance information for selecting from a plurality of mapping types available for code block mapping; receiving, from the base station based at least in part on transmitting the assistance information, an indication of a selected mapping type for code block mapping; and communicating with the base station based at least in part on the selected mapping type for code block mapping.

Aspect 2: The method of aspect 1, wherein transmitting the assistance information comprises: selecting the mapping type from the plurality of mapping types available for code block mapping based at least in part on a metric of a channel between the base station and the UE; and transmitting, to the base station, a recommendation of the selected mapping type.

Aspect 3: The method of aspect 2, wherein the metric of the channel comprises measurements performed on channel state information reference signals, measurements performed on tracking reference signals, an estimation of a decoding probability for each code block, a metric of impairments at the UE, or a combination thereof.

Aspect 4: The method of any of aspects 2 through 3, further comprising: receiving, from the base station, radio resource control signaling indicating the plurality of mapping types from which the UE is to select the mapping type for the recommendation.

Aspect 5: The method of any of aspects 1 through 4, wherein transmitting the assistance information comprises: transmitting, to the base station, measurements performed on channel state information reference signals, measurements performed on tracking reference signals, an estimation of a decoding probability for each code block, an indication of impairments at the UE, or a combination thereof.

Aspect 6: The method of any of aspects 1 through 5, wherein the assistance information is based at least in part on a previous quantity of downlink allocations.

Aspect 7: The method of any of aspects 1 through 6, wherein the plurality of mapping types comprises a frequency-first mapping type, a time-first mapping type, a frequency-first-per-layer mapping type, or a combination thereof.

Aspect 8: The method of any of aspects 1 through 7, wherein receiving the indication of the selected mapping type for code block mapping comprises: receiving the indication of the selected mapping type for code block mapping in downlink control information, a medium access control control element, or radio resource control signaling.

Aspect 9: The method of any of aspects 1 through 8, wherein transmitting the assistance information comprises: transmitting the assistance information in a channel state feedback report to the base station.

Aspect 10: The method of aspect 9, wherein the channel state feedback report comprises a field for the assistance information.

Aspect 11: The method of any of aspects 1 through 10, wherein communicating with the base station based at least in part on the selected mapping type comprises: mapping one or more code blocks to a set of resources based at least in part on the selected mapping type; and transmitting, to the base station, the one or more code blocks on the set of resources based at least in part on the mapping.

Aspect 12: The method of any of aspects 1 through 11, wherein communicating with the base station based at least in part on the selected mapping type comprises: receiving, from the base station, one or more code blocks mapped to a set of resources; and de-mapping the one or more code blocks from the set of resources based at least in part on the selected mapping type.

Aspect 13: A method for wireless communication at a base station, comprising: selecting a mapping type from a plurality of mapping types available for code block mapping to use for communications with a UE; transmitting, to the UE, an indication of the selected mapping type for code block mapping; and communicating with the UE based at least in part on the selected mapping type for code block mapping.

Aspect 14: The method of aspect 13, wherein selecting the mapping type comprises: selecting the mapping type from the plurality of mapping types based at least in part on scheduling information for the communications with the UE, a channel state feedback report for downlink, a sounding reference signal based rank, a modulation and coding scheme estimation for uplink, a delay spread, a doppler spread, signal-to-noise ratio measurements, an uplink code block decoding statistic, UE speed measurements or reports, latency requirements for the communications with the UE, or a combination thereof.

Aspect 15: The method of any of aspects 13 through 14, wherein selecting the mapping type comprises: receiving, from the UE, assistance information for selecting the mapping type from the plurality of mapping types available for code block mapping, wherein selecting the mapping type comprises: selecting the mapping type from the plurality of mapping types based at least in part on the assistance information.

Aspect 16: The method of aspect 15, wherein the assistance information comprises a recommendation of the selected mapping type for code block mapping.

Aspect 17: The method of aspect 16, further comprising: transmitting, to the UE, radio resource control signaling indicating the plurality of mapping types from which the UE is to select the mapping type for the recommendation.

Aspect 18: The method of any of aspects 15 through 17, wherein the assistance information comprises measurements performed on channel state information reference signals, measurements performed on tracking reference signals, an estimation of a decoding probability for each code block, an indication of impairments at the UE, or a combination thereof.

Aspect 19: The method of any of aspects 15 through 18, wherein the assistance information is based at least in part on a previous quantity of downlink allocations.

Aspect 20: The method of any of aspects 15 through 19, wherein receiving the assistance information comprises: receiving the assistance information in a channel state feedback report to the base station.

Aspect 21: The method of aspect 20, wherein the channel state feedback report comprises a field for the assistance information.

Aspect 22: The method of any of aspects 13 through 21, wherein the plurality of mapping types comprises a frequency-first mapping type, a time-first mapping type, or a frequency-first-per-layer mapping type.

Aspect 23: The method of any of aspects 13 through 22, wherein transmitting the indication of the selected mapping type for code block mapping comprises: transmitting the indication of the selected mapping type for code block mapping in downlink control information, a medium access control control element, or radio resource control signaling.

Aspect 24: The method of any of aspects 13 through 23, wherein communicating with the UE based at least in part on the selected mapping type comprises: mapping one or more code blocks to a set of resources based at least in part on the selected mapping type; and transmitting, to the UE, the one or more code blocks on the set of resources based at least in part on the mapping.

Aspect 25: The method of any of aspects 13 through 24, wherein communicating with the UE based at least in part on the selected mapping type comprises: receiving, from the UE, one or more code blocks mapped to a set of resources; and de-mapping the one or more code blocks from the set of resources based at least in part on the selected mapping type.

Aspect 26: An apparatus for wireless communication at a UE, comprising a processor; memory coupled with the processor; and instructions stored in the memory and executable by the processor to cause the apparatus to perform a method of any of aspects 1 through 12.

Aspect 27: An apparatus for wireless communication at a UE, comprising at least one means for performing a method of any of aspects 1 through 12.

Aspect 28: A non-transitory computer-readable medium storing code for wireless communication at a UE, the code comprising instructions executable by a processor to perform a method of any of aspects 1 through 12.

Aspect 29: An apparatus for wireless communication at a base station, comprising a processor; memory coupled with the processor; and instructions stored in the memory and executable by the processor to cause the apparatus to perform a method of any of aspects 13 through 25.

Aspect 30: An apparatus for wireless communication at a base station, comprising at least one means for performing a method of any of aspects 13 through 25.

Aspect 31: A non-transitory computer-readable medium storing code for wireless communication at a base station, the code comprising instructions executable by a processor to perform a method of any of aspects 13 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   at least one processor; and
   at least one memory coupled with the at least one processor, wherein the at least one processor is configured to:
      transmit, to a network entity, assistance information for selecting a mapping type from a plurality of mapping types available for code block mapping, wherein the assistance information comprises a recommended mapping type of the plurality of mapping types, and wherein the plurality of mapping types comprises a frequency-first mapping type, a time-first mapping type, and a frequency-first-per-layer mapping type;
      receive, from the network entity, an indication of a selected mapping type for code block mapping, wherein the selected mapping type is based at least in part on the transmitted assistance information; and
      communicate with the network entity based at least in part on the selected mapping type for code block mapping.

2. The UE of claim 1, wherein, to transmit the assistance information, the at least one processor is configured to:
   select the recommended mapping type from the plurality of mapping types available for code block mapping based at least in part on a metric of a channel between the network entity and the UE.

3. The UE of claim 2, wherein the metric of the channel comprises measurements performed on channel state information reference signals, measurements performed on tracking reference signals, an estimation of a decoding probability for each code block, a metric of impairments at the UE, or a combination thereof.

4. The UE of claim 2, wherein the at least one processor is configured to:
   receive, from the network entity, radio resource control signaling indicating the plurality of mapping types from which the UE is to select the mapping type for the recommendation.

5. The UE of claim 1, wherein the assistance information comprises a metric of a channel, and wherein the metric of the channel comprises measurements performed on channel state information reference signals.

6. The UE of claim 1, wherein the assistance information is based at least in part on a previous quantity of downlink allocations.

7. The UE of claim 1, wherein, to receive the indication of the selected mapping type for code block mapping, the at least one processor is configured to:
   receive the indication of the selected mapping type for code block mapping in downlink control information, a medium access control control element, or radio resource control signaling.

8. The UE of claim 1, wherein, to transmit the assistance information, the at least one processor is configured to:
   transmit the assistance information in a channel state feedback report to the network entity.

9. The UE of claim 8, wherein the channel state feedback report comprises a field for the assistance information.

10. The UE of claim 1, wherein, to communicate with the network entity based at least in part on the selected mapping type, the at least one processor is configured to:
    map one or more code blocks to a set of resources based at least in part on the selected mapping type; and
    transmit, to the network entity, the one or more code blocks on the set of resources based at least in part on the mapping.

11. The UE of claim 1, wherein, to communicate with the network entity based at least in part on the selected mapping type, the at least one processor is configured to:
    receive, from the network entity, one or more code blocks mapped to a set of resources; and
    de-map the one or more code blocks from the set of resources based at least in part on the selected mapping type.

12. The UE of claim 1, wherein the assistance information comprises a metric of a channel, and wherein the metric of the channel comprises measurements performed on tracking reference signals.

13. The UE of claim 1, wherein the assistance information comprises a metric of a channel, and wherein the metric of the channel comprises an estimation of a decoding probability for each code block.

14. The UE of claim 13, wherein the metric of the channel indicates one or more one or more deviations in decoding probability between a quantity of code blocks.

15. The UE of claim 1, wherein the assistance information comprises a metric of a channel, and wherein the metric of the channel comprises an indication of impairments at the UE.

16. A network entity for wireless communication, comprising:
    at least one processor; and
    at least one memory coupled with the at least one processor, wherein the at least one processor is configured to:

receive, from a user equipment (UE), assistance information associated with selecting from a plurality of mapping types available for code block mapping, wherein the assistance information comprises a recommended mapping type of the plurality of mapping types, and wherein the plurality of mapping types comprises a frequency-first mapping type, a time-first mapping type, and a frequency-first-per-layer mapping type;

select a mapping type from the plurality of mapping types available for code block mapping to use for communications with the UE and based at least in part on the assistance information;

transmit, to the UE, an indication of the selected mapping type for code block mapping; and communicate with the UE based at least in part on the selected mapping type for code block mapping.

17. The network entity of claim 16, wherein, to select the mapping type, the at least one processor is configured to:
select the mapping type from the plurality of mapping types based at least in part on scheduling information for the communications with the UE, a channel state feedback report for downlink, a sounding reference signal based rank, a modulation and coding scheme estimation for uplink, a delay spread, a doppler spread, signal-to-noise ratio measurements, an uplink code block decoding statistic, UE speed measurements or reports, latency requirements for the communications with the UE, or a combination thereof.

18. The network entity of claim 16, wherein the at least one processor is configured to:
transmit, to the UE, radio resource control signaling indicating the plurality of mapping types from which the UE is to select the recommended mapping type.

19. The network entity of claim 16, wherein the assistance information comprises a metric of a channel, and wherein the metric of the channel comprises measurements performed on channel state information reference signals, measurements performed on tracking reference signals, an estimation of a decoding probability for each code block, an indication of impairments at the UE, or a combination thereof.

20. The network entity of claim 16, wherein the assistance information is based at least in part on a previous quantity of downlink allocations.

21. The network entity of claim 16, to receive the assistance information, the at least one processor is configured to:
receive the assistance information in a channel state feedback report to the network entity.

22. The network entity of claim 21, wherein the channel state feedback report comprises a field for the assistance information.

23. The network entity of claim 16, wherein, to transmit the indication of the selected mapping type for code block mapping, the at least one processor is configured to:
transmit the indication of the selected mapping type for code block mapping in downlink control information, a medium access control control element, or radio resource control signaling.

24. The network entity of claim 16, wherein, to communicate with the UE based at least in part on the selected mapping type, the at least one processor is configured to:
map one or more code blocks to a set of resources based at least in part on the selected mapping type; and
transmit, to the UE, the one or more code blocks on the set of resources based at least in part on the mapping.

25. The network entity of claim 16, wherein, to communicate with the UE based at least in part on the selected mapping type, the at least one processor is configured to:
receive, from the UE, one or more code blocks mapped to a set of resources; and
de-map the one or more code blocks from the set of resources based at least in part on the selected mapping type.

26. A method for wireless communication at a user equipment (UE), comprising:
transmitting, to a network entity, assistance information for selecting a mapping type from a plurality of mapping types available for code block mapping, wherein the assistance information comprises a recommended mapping type of the plurality of mapping types, and wherein the plurality of mapping types comprises a frequency-first mapping type, a time-first mapping type, and a frequency-first-per-layer mapping type;

receiving, from the network entity, an indication of a selected mapping type for code block mapping, wherein the selected mapping type is based at least in part on the transmitted assistance information; and communicating with the network entity based at least in part on the selected mapping type for code block mapping.

27. The method of claim 26, wherein transmitting the assistance information comprises:
selecting the recommended mapping type from the plurality of mapping types available for code block mapping based at least in part on a metric of a channel between the network entity and the UE.

28. The method of claim 27, further comprising:
receiving, from the network entity, radio resource control signaling indicating the plurality of mapping types from which the UE is to select the recommended mapping type.

29. A method for wireless communication at a network entity, comprising:
receive, from a user equipment (UE), assistance information associated with selecting from a plurality of mapping types available for code block mapping, wherein the assistance information comprises a recommended mapping type of the plurality of mapping types, and wherein the plurality of mapping types comprises a frequency-first mapping type, a time-first mapping type, and a frequency-first-per-layer mapping type;

selecting a mapping type from the plurality of mapping types available for code block mapping to use for communications with the UE and based at least in part on the assistance information;

transmitting, to the UE, an indication of the selected mapping type for code block mapping; and communicating with the UE based at least in part on the selected mapping type for code block mapping.

30. The method of claim 29, wherein selecting the mapping type comprises:
selecting the mapping type from the plurality of mapping types based at least in part on scheduling information for the communications with the UE, a channel state feedback report for downlink, a sounding reference signal based rank, a modulation and coding scheme estimation for uplink, a delay spread, a doppler spread, signal-to-noise ratio measurements, an uplink code block decoding statistic, UE speed measurements or reports, latency requirements for the communications with the UE, or a combination thereof.

\* \* \* \* \*